United States Patent
Challa et al.

(10) Patent No.: US 6,877,665 B2
(45) Date of Patent: *Apr. 12, 2005

(54) SYSTEM, METHOD, AND APPARATUS FOR COMMUNICATING INFORMATION ENCODED IN A LIGHT-BASED SIGNAL USING A FOB DEVICE

(75) Inventors: Nagesh Challa, Saratoga, CA (US); Venkata T. Gobburu, San Jose, CA (US); Michel E. Gannage, Los Altos, CA (US)

(73) Assignee: ecrio, inc., Cupertino, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 10/104,428

(22) Filed: Mar. 21, 2002

(65) Prior Publication Data

US 2002/0145043 A1 Oct. 10, 2002

Related U.S. Application Data

(63) Continuation-in-part of application No. 09/996,847, filed on Nov. 19, 2001, now Pat. No. 6,736,322, which is a continuation-in-part of application No. 09/963,218, filed on Sep. 25, 2001, now Pat. No. 6,685,093.
(60) Provisional application No. 60/349,848, filed on Jan. 17, 2002, provisional application No. 60/313,753, filed on Aug. 20, 2001, provisional application No. 60/252,101, filed on Nov. 21, 2000, and provisional application No. 60/252,346, filed on Nov. 20, 2000.

(51) Int. Cl.[7] ................................................. G06K 7/10
(52) U.S. Cl. ............................ 235/462.46; 235/472.01; 235/375
(58) Field of Search ...................... 235/462.01–462.48, 235/472.01, 472.02, 472.03, 454, 455, 456, 494, 470, 375, 380

(56) References Cited

U.S. PATENT DOCUMENTS

| | | | | |
|---|---|---|---|---|
| 3,993,861 A | * | 11/1976 | Baer | 348/473 |
| 4,329,684 A | | 5/1982 | Monteath et al. | 340/707 |
| 4,403,869 A | | 9/1983 | Crutcher | 368/10 |
| 4,477,874 A | | 10/1984 | Ikuta et al. | 364/424 |
| 4,613,904 A | | 9/1986 | Lurie | 358/142 |

(Continued)

FOREIGN PATENT DOCUMENTS

WO     WO 00/03328     1/2000

OTHER PUBLICATIONS

Aeritas Inc., New Wireless Check–In and Security Solution for Travel—Aeritas Freedom Pass™ [online], [retrieved on Feb. 5, 2002]. Retrieved from the Internet<URL:http://www.aeritas.com>.

(Continued)

Primary Examiner—Thien M. Le
(74) Attorney, Agent, or Firm—Altera Law Group, LLC

(57) ABSTRACT

A system, method, and apparatus for communicating information in a light-based signal utilizing a fob device is disclosed. One method disclosed includes encoding transmission information data into a bar code format; generating a signal from the bar code format to simulate a reflection of a scanning beam being moved across a static visual image of the bar code format; and actively transmitting the signal as light pulses from the fob device. Alternatively, commercial information data may be transmitted to a light-based data receiving device by generating a signal from commercial information data and actively transmitting the signal as light pulses from a fob device. Transmission information data may also be transmitted from a fob device by generating a first signal from a first encoded format; generating a second signal from a second encoded format; transmitting the first signal as light pulses from a fob device; and transmitting the second signal from the fob device.

99 Claims, 26 Drawing Sheets

U.S. PATENT DOCUMENTS

| | | | |
|---|---|---|---|
| 4,736,096 A | | 4/1988 | Ushikubo .................. 235/472 |
| 4,879,540 A | | 11/1989 | Ushikubo .................. 235/385 |
| 4,990,756 A | | 2/1991 | Hoemann .................. 235/462 |
| 4,999,617 A | | 3/1991 | Uemura et al. ............. 340/706 |
| 5,023,438 A | | 6/1991 | Wakatsuki et al. .......... 235/472 |
| 5,059,778 A | | 10/1991 | Zouzoulas et al. .......... 235/472 |
| 5,468,946 A | | 11/1995 | Oliver ........................ 235/462 |
| 5,488,571 A | | 1/1996 | Jacobs et al. .......... 364/705.07 |
| 5,523,794 A | | 6/1996 | Mankovitz et al. ......... 348/460 |
| 5,570,297 A | | 10/1996 | Brzezinski et al. ..... 364/514 R |
| 5,640,002 A | * | 6/1997 | Ruppert et al. ........ 235/462.46 |
| 5,682,030 A | * | 10/1997 | Kubon .................. 235/462.25 |
| 5,744,789 A | | 4/1998 | Kashi ......................... 235/472 |
| 5,760,383 A | * | 6/1998 | Heske, III .............. 235/462.16 |
| 5,773,954 A | | 6/1998 | VanHorn ....................... 320/2 |
| 5,821,512 A | | 10/1998 | O'Hagan et al. ........... 235/383 |
| 5,832,457 A | | 11/1998 | O'Brien et al. .............. 705/14 |
| 5,850,304 A | | 12/1998 | Elmers et al. .............. 359/142 |
| 5,857,079 A | | 1/1999 | Claus et al. .................. 704/33 |
| 5,880,769 A | * | 3/1999 | Nemirofsky et al. ........ 725/139 |
| 5,918,211 A | | 6/1999 | Sloane ........................ 705/16 |
| 5,923,735 A | | 7/1999 | Swartz et al. ............ 379/93.12 |
| 5,953,047 A | | 9/1999 | Nemirofsky ................ 348/13 |
| 5,979,757 A | | 11/1999 | Tracy et al. ................ 235/383 |
| 6,015,089 A | | 1/2000 | Hecht et al. |
| 6,041,374 A | | 3/2000 | Postman et al. .............. 710/73 |
| 6,047,374 A | * | 4/2000 | Barton ....................... 713/150 |
| 6,070,793 A | | 6/2000 | Reichl et al. |
| 6,075,971 A | | 6/2000 | Williams et al. ............. 455/5.1 |
| 6,082,620 A | | 7/2000 | Bone, Jr. ............... 235/462.16 |
| 6,101,483 A | | 8/2000 | Petrovich et al. ............ 705/26 |
| 6,119,942 A | * | 9/2000 | Pierenkemper et al. 235/462.22 |
| 6,119,943 A | | 9/2000 | Christy ...................... 235/468 |
| 6,123,259 A | | 9/2000 | Ogasawara ................ 235/380 |
| 6,129,274 A | | 10/2000 | Suzuki ....................... 235/381 |
| 6,129,276 A | | 10/2000 | Jelen et al. ................. 235/383 |
| 6,138,911 A | | 10/2000 | Fredregill et al. .......... 235/383 |
| 6,179,206 B1 | | 1/2001 | Matsumori |
| 6,281,820 B1 | * | 8/2001 | Fields ........................ 341/137 |
| 6,293,462 B1 | | 9/2001 | Gangi ........................ 235/380 |
| 6,315,195 B1 | | 11/2001 | Ramachandran ............ 235/380 |
| 6,318,631 B1 | * | 11/2001 | Halperin ..................... 235/383 |
| 6,336,587 B1 | | 1/2002 | He et al. |
| 6,394,354 B1 | | 5/2002 | Wilz, Sr. et al. |
| 6,472,805 B1 | | 10/2002 | Nakagawa et al. |
| 6,685,093 B2 | * | 2/2004 | Challa et al. .......... 235/462.46 |
| 2002/0022963 A1 | | 2/2002 | Miller et al. .................... 705/1 |
| 2002/0030105 A1 | | 3/2002 | Miller et al. ........... 235/462.13 |
| 2002/0042722 A1 | | 4/2002 | Tsuji, et al. |
| 2002/0059146 A1 | | 5/2002 | Keech |
| 2002/0063150 A1 | | 5/2002 | Nygren, et al. |
| 2002/0198777 A1 | | 12/2002 | Yuasa |
| 2003/0088442 A1 | | 5/2003 | Michael, et al |
| 2003/0104820 A1 | | 6/2003 | Greene, et al. |

OTHER PUBLICATIONS

Aeritas Inc., Aeritas Solutions—Overview [on–line], [re-trieved on Feb. 5, 2002]. Retrieved from the Internet<URL: http//www.aeritas.com/aeritas.jsp?function=solutions&sub=overview>.

Aeritas Inc., Aeritas Solutions—Platform [on–line], [re-trieved on Feb. 5, 2002]. Retrieved from the Internet<URL: http//www.aeritas.com/aeritas.jsp?function=solutions&sub=platform>.

Aeritas Inc., Electronic Barcode Solution Works with Various Wireless Devices [on–line], [retrieved on Feb. 5, 2002]. Retrieved from the Internet<URL: http//www.aeritas.com/aeritas.jsp?function=solutions&sub=barcode>.

Aeritas Inc., New Fast–Track Wireless Chech–In and Security Solutions [on–line], [retrieved on Feb. 5, 2002]. Retrieved from the Internet<URL: http//www.aeritas.com/aeritas.jsp?function=solutions&sub=travel>.

Aeritas Inc., Low Cost Solution Using Scalable Technology [on–line], [retrieved on Feb. 5, 2002]. Retrieved from the Internet<URL: http//www.aeritas.com/aeritas.jsp?function=solutions&sub=travel&p=>.

Aeritas Inc., Aeritas Solutions–Aeritas Aer Wallet [on–line], [retrieved on Feb. 5, 2002]. Retrieved from the Internet<URL: http//www.aeritas.com/aeritas.jsp?function=solutions&sub=voice>.

Aeritas Inc., Aeritas Custom Solutions–Incorporate Aeritas FreedomPass™ Line–Busting Technology for Your Customers Today![on–line], [retrieved on Feb. 5, 2002]. Retrieved from the Internet<URL: http//www.aeritas.com/aeritas.jsp-?function=solutions&sub=custom>.

Aeritas, Inc., Company–Aeritas, Inc.[on–line], [retrieved on Feb. 5, 2002]. Retrieved from the Internet<URL: http//www.aeritas.com/aeritas.jsp?function=company&sub=aeritasinc>.

Aeritas, Inc., Company–Contact Us[on–line], [retrieved on Feb. 5, 2002]. Retrieved from the Internet<URL: http//www.aeritas.com/aeritas.jsp?function=solutions&sub=contact>.

Aeritas, Inc., Press Releases—Welcome to the Aeritas Media Room [on–line], [retrieved on Feb. 5, 2002]. Retrieved from the Internet<URL:http//www.aeritas.com/aeritas.jsp?function=press&sub=news>. et. seq.

Aeritas, Inc., Press—Aeritas–Related Press Articles[on–line], [retrieved on Feb. 5, 2002]. Retrieved from the Internet<URL: http//www.aeritas.com/aeritas.jsp?function=press&sub=articles>.

Conlon, Michael. Reuters.com Away on Business: Electronic Security, Nov. 22, 2001 [on–line], Retrieved from the Internet<URL: http//www.aeritas.com/includes/press/reuters–11–22–01.htm>.

Goldstein, Alan. The Dallas Morning News. Stalled at the Gate, Firm Checks in New Plan, Nov. 14, 2001 [online] [retrieved on Feb. 5, 2002]. Retrieved from the Internet<URL: http://www.aeritas.com/includes/press/dmn1114.htm>.

Wireless Developer Network News. Two Entrepreneurs Flying High on Sept. 11, Nov. 14, 2001[online], [retrieved on Feb. 5, 2002]. Retrieved from the Internet<URL: http//www.aeritas.com/includes/press/devnet1114.htm>.

m–Travel.com. Aeritas Launches Secure Wireless Check–In With Barcode, Nov. 9, 2001[online], [retrieved on Feb. 5, 2002]. Retrieved from the Internet<URL: http//www.aeritas.com/includes/press/mtravel 1109.htm>.

Europe News. FreedomPass™ Provides Increased Security and Reduces Airport Congestion, Nov. 8, 2001 [online], [retrieved on Feb. 5, 2002]. Retrieved from the Internet<URL: http://www.aeritas.com/includes/euronews 1108.htm>.

M Business Daily. Aeritas Launches Wireless Check–In and Security Service, Nov. 8, 2001 [online], [retreived on Feb. 5, 2002]. Retrieved from the Internet<URL: http://www.aeritas.com/includes/press/mbd1108.htm>.

Smith, Brad. Wireless Week.com. Resuming Mobility— Airlines Cautiously Reinstate Wireless Check–In, Oct. 29, 2001[online],[retreived on Feb. 5, 2002]. Retrieved from the Internet<URL: http://www.aeritas.com/includes/press/wwc1029.htm>.

Closser, Stacey. Dallas–Fort Worth TechBiz. Airport Security Reinforces Need for Company's Wireless Check–In App, Oct. 22, 2001 [online], [retrieved on Feb. 5, 2002]. Retrieved from the Internet<URL: http://www.aeritas.com/includes/press/dfwtb10101.htm>.

Hobica, G. & Liang, K. Mobile Computing & Communications. Now Boarding: All Phones, [online], [retrieved on Feb. 5, 2002]. Retrieved from the Internet<URL: http://www.aeritas.com/includes/press/mobilecomputing.html>.

WirelessWeek.com Site of the Week—Aeritas Inc., Jul. 23, 2001 [online], [retrieved on Feb. 5, 2002]. Retrieved from the Internet<URL:http//www.aeritas.com/includes/press/WireWeek_com.htm>.

Johnston, David C., The New York TImes. Travel Advisory–New Cell Phone Trick: It's a Boarding Pass, Jul. 22, 2001 [online], [retrieved on Feb. 5, 2002]. Retrieved from the Internet<URL: http//www.aeritas.com/includes/press/nytimes.htm>.

Speech Technology Magazine. News & Views—Siemens Business Services, Aeritas Announce Partnership, May/Jun. 2001 [online], [retrieved on Feb. 5, 2002]. Retrieved from the Internet<URL: http://www.aeritas.com/includes/press/speech.htm>.

Muraskin, Ellen. Communications Convergence.com Speaking Tour: ASR and TTS Follow the Money—Planes, Trains, Bar Codes, and Voice Verification, Jun. 5, 2001 [online], [retrieved on Feb. 5, 2002]. Retrieved from the Internet<URL: http://www.aeritas.com/includes/press/convergence.htm>.

Bounds, Jeff. Dallas Business Journal. Region Travels to Front in Reservations, Jun 1, 2001 [online], [retrieved on Feb. 5, 2002]. Retrieved from the Internet<URL: http://www.aeritas.com/includes/press/dallas_business.htm>.

Gawlicki, Scott M. Telecom Click. Wireless Apps Get Real, Jun. 1, 2001 [online], [retrieved on Feb. 5, 2002]. Retrieved from the Internet<URL: http://www.aeritas.com/includes/press/telecomclick.htm>.

Hastings, Nick. Dow Jones Newswires. From the Floor. An Italian Job, May 30, 2001 [online], [retrieved on Feb. 5, 2002]. Retrieved from the Internet<URL: http://www.aeritas.com/includes/press/Dow%20Jones%20Interactive.htm>.

Bray, Roger. Financial Times FT.com. Inside Track: Lufthansa Plans Check–In by Wap, May 29, 2001 [online], [retrieved on Feb. 5, 2002]. Retrieved from the Internet<URL: http://www.aeritas.com/includes/press/financial_times.htm>.

Elachi, Joanna. CommWeb.com. Lufthansa Debuts Barcode Check–In and Boarding, May 25, 2001 [online], [retrieved on Feb. 5, 2002]. Retrieved from the Internet<URL: http://www.aeritas.com/includes/press/Lufthansa.htm>.

Worldroom Travel Digest. Lufthansa Launches Mobile Check–In, May 25, 2001 [online], [retrieved on Feb. 5, 2002]. Retrieved from the Internet<URL:http://www.aeritas.com/includes/press/worldroom.htm>.

McDonough, Brian. Wireless Newsfactor. Wireless Connections Let Lufthansa Customers Board on the Fly, May 24, 2001 [online], [retrieved on Feb. 5, 2002]. Retrieved from the Internet<URL: http://www.aeritas.com/includes/press/wireless_news2.htm>.

Aviation Daily. Lufthansa Inks Check–In Deal, May 24, 2001 [online], [retrieved on Feb. 5, 2002]. Retrieved from the Internet<URL: http://www.aeritas.com/includes/press/aviation files/channel_ebiz.html>.

Eye For Travel.com, Lufthansa m–Barqs On Wireless Check–In Project, May 23, 2001 [online], [retrieved on Feb. 5, 2002]. Retrieved from the Internet<URL:http//www.aeritas.com/includes/press/eye_travel.htm>.

Mobileinfo.com, Lufthansa Uses Mobile Devices As Digital Boarding Pass, May 22, 2001 [online], [retrieved on Feb. 5, 2002]. Retrieved from the Internet<URL: http//www.aeritas.com/includes/press/mobile_info.htm>.

Closser, Stacey. Dallas–Forth Worth TechBiz, Airline Boarding Passes Made Wireless, May 22, 2001 [online], [retrieved on Feb. 5, 2002]. Retrieved from the Internet<URL: http//www.aeritas.com/includes/press/dfw_techbiz_052201.htm>.

Turek, Norbert. Informationweek.com News, WAP Apps Make Their Way To Biz–Critical Services, Mar. 19, 2001 [online], [retrieved on Feb. 5, 2002]. Retrieved from the Internet<URL: http//www.aeritas.com/includes/press/information.htm>.

Houck, J. B. Wireless Newfactor, Have PDA? Will Travel, Mar. 16, 2001 [online], [retrieved on Feb. 5, 2002]. Retrieved from the Internet<URL:http//www.aeritas.com/includes/press/wireless_news.htm>.

Carter, Wayne. Dallas Localbusiness.com, Aeritas wants to bring mobile commerce customers on board, Mar. 15, 2001 [online], [retrieved on Feb. 5, 2002]. Retrieved from the Internet<URL: http//www.aeritas.com/includes/press/localbusiness.htm>.

Klitsgaard, Neils. Global Bluetooth Tracking, Newsletter, Mar. 14, 2001 [online], [retrieved on Feb. 5, 2002]. Retrieved from the Internet<URL:http//www.aeritas.com/includes/press/bluetags_files/Newsletter1.asp>.

Global Wireless Siemens Teams up for m–commerce travel service, Mar. 2, 2001 [online], [retrieved on Feb. 5, 2002]. Retrieved from the Internet<URL: http//www.aeritas.com/includes/press/global_news.htm>.

Boyter, Scott. Dallas–Forth Worth TechBiz, Aeritas signs deal with Siemens for European travel application, Mar. 2, 2001 [online], [retrieved on Feb. 5, 2002]. Retrieved from the Internet<URL: http//www.aeritas.com/includes/press/DFWTB–3–2–01.htm>.

Conlon, Michael. Reuters Technology, Away on Business: With the Wave of a Phone, Feb. 24, 2001 [online], [retrieved on Feb. 5, 2002]. Retrieved from the Internet<URL: http//www.aeritas.com/includes/press/SVNews2–24–2001.htm>.

Boyter, Scott. Dallas–Forth Worth TechBiz, Aeritas tries to fill void until 3G wireless is ready; Mobile boarding pass is just one application being tested, Feb. 19, 2001 [online], [retrieved on Feb. 5, 2002]. Retrieved from the Internet<URL: http//www.aeritas.com/includes/press/DFW-TechBiz.htm>.

Alan Goldstein. DallasNews.com, the Dallas Morning News, Impulsity a new voice in mobile commerce; Dec. 27, 2000, [online], [retrieved on Feb. 5, 2002]. Retrieved from the Internet<URL: http//www.aeritas.com/includes/press/DMN–AG.htm>.

Peterson, A. & Harris, N. The Wall Street Journal, WSJ.com, Wireless Web's Vast Promises Have So Far Been Unkept in U.S., Dec. 1, 2000 [online], [retrieved on Feb. 5, 2002]. Retrieved from the Internet<URL:http//www.aeritas.com/includes/press/wsj.htm>.

Goldstein, A. & Bajaj, V. The Dallas Morning News, DallasNews.com, Rush toward Wireless devices collides with reality of what they deliver, by Alan Goldstein, Nov. 30, 2000 [online], [retrieved on Feb. 5, 2002]. Retrieved from the Internet<URL: http//www.aeritas.com/includes/press/DallasMorningNews.htm>.

Meehan, Michael. Computerworld, Sabre Rolling out wireless check–in system for air travelers, Oct. 20, 2000 [online], [retrieved on Feb. 5, 2002]. Retrieved from the Internet<URL: http//www.aeritas.com/includes/press/Computerworld.htm>.

Wireless Today, Wireless Could be Cure For Travelers' Airport Woes [online], [retrieved on Feb. 5, 2002]. Retrieved from the Internet<URL: http//www.aeritas.com/includes/pressWirelessToday10–19.htm>.

Pillar, Dan. Star–Telegram.com, Wireless airport check–in to use cell phones, hand–held computers, Oct. 18, 2000 [online], [retrieved on Feb. 5, 2002]. Retrieved from the Internet<URL: http//www.aeritas.com/includes/press/StarTelegram.htm>.

Aeritas Inc. Press—What's the Buzz?[online], [retrieved on Feb. 5, 2002]. Retrieved from the Internet<URL: http//www.aeritas.com/Aeritas.jsp?function=press&sub=buzz>.

Aeritas Inc., Sitemap [online], [retrieved on Feb. 5, 2002]. Retrieved from the Internet<URL: http//www.aeritas.jsp?function=sitemap>.

H.R. Damon Gonzalez, Jr., Ronald J. Brown, and Lawrence Faulkner; "Creating An End–to–End Digital Payment System," Oct. 15, 1999, 17 pages.

Mastercard International Incorporated, Mobile Commerce, http://www.mastercardintl.com/newtechnology/mcommerce/whatis/payment.html; printed Oct. 10, 2001.

The International Engineering Consortium; "Wireless Short Message Service (SMS);" http://www.iec.org;printed Nov. 8, 2001; 19 pages.

Michael Meehan; "Sabre rolling out wireless check–in system for air travelers;" file://c:\Law Practice Clients\ecrio\A1132USOV . . . \01199NAV47_STO5263000.htm; printed Nov. 21, 2000; 3 pages.

Betsy Wade; "Air Tickets Shred a Barrier;" http://www.nytimes.com/2000/11/19/technology/19PRAC.html?printpage=yes; printed Nov. 18, 2000; 5 pages.

"Bar Code 1: 2–Dimensional Bar Code," http://www.adams1.com/pub/russadam/stack.html, Adams Communications (Copyright 1995–2002), 11 pages.

Bricklin, Daniel, "Sony eMarker: How a Clever System Works," www.bricklin.com(Copyright 1999–2001, 4 pages.

* cited by examiner

SYSTEM, METHOD, AND APPARATUS FOR COMMUNICATING INFORMATION ENCODED IN A LIGHT-BASED SIGNAL USING A FOB DEVICE

CROSS-REFERENCE TO RELATED APPLICATIONS

This application claims the benefit of U.S. Provisional Application Ser. No. 60/349,848 entitled "System, Method, and Apparatus for Communicating Information Encoded in a Light-Based Signal Using a Fob Device" and filed on Jan. 17, 2002 by Nagesh Challa, et al., which is incorporated herein by reference in its entirety. This application is also a continuation-in-part of U.S. Pat. No. 6,736,322 entitled "Method and Apparatus for Acquiring, Maintaining, and Using Information to be Communicated in Bar Code Form with a Mobile Communications Device" and issued on May 18, 2004 to now U.S. Pat. No. 6,736,322to Venkata T. Gobburu et al., which application claims the benefit of U.S. Provisional Application No. 60/252,101, filed Nov. 21, 2000 (Gobburu et al., Method and apparatus for acquiring, maintaining and using information to be communicated in bar code form with a mobile communications device); U.S. Provisional Application Ser. No. 60/252,346, filed Nov. 20, 2000 (Gobburu et al., Method and apparatus for acquiring, maintaining and using information to be communicated in bar code form with a mobile communications device); and U.S. Provisional Application Ser. No. 60/313,753, filed Aug. 20, 2001 (Gobburu et al., Method and apparatus for acquiring, maintaining and using information to be communicated in bar code form with a mobile communications device); all of which are incorporated herein by reference in their entirety. This application is further a continuation-in-part of U.S. Pat. No. 6,685,093 entitled "System, Method, and Apparatus for Communicating Information Between a Mobile Communications Device and a Bar Code Reader" and issued on Feb. 3, 2004 to Nagesh Challa et al., which is also incorporated herein by reference in its entirety.

BACKGROUND OF THE INVENTION

1. Field of the Invention

This invention relates generally to communicating information encoded in a light-based signal, and more specifically to systems, methods and apparatuses for communicating that information encoded in a light-based signal using a fob device.

2. Description of Related Art

The use of bar code scanners in a great many aspects of everyday life is commonplace. Bar code scanners are found in many different types of facilities, including supermarkets, airport security, check-in and boarding areas, stadiums, libraries, test centers, conference centers, and many other places. The use of bar code scanners has dramatically increased the speed at which many commonplace transactions can be completed.

While typically printed on paper labels and stubs, bar codes may also be presented on the electronic displays of electronic devices such as mobile communications devices. For example, in International Publication no. WO 00/03328 dated Jan. 20, 2000, Motorola Inc. of Schaumburg, Ill., describes the display of bar coded information on a selective call receiver ("SCR"). Demographic information concerning the user of the SCR is stored in the SCR. The demographic information is visually displayed on the SCR as a bar code such that it can be read by a bar code scanner, as in a store or at a point-of-sale. A stored coupon may also be displayed in bar code format so that it can be read and redeemed at the point-of-sale. A stored affinity card code and a unique identifier may also be displayed in bar code format so that they can be read to identify a selected affinity group and the customer at the point-of-sale. As a further example, Aeritas Inc. of Dallas, Tex., has proposed using voice recognition technology to allow a cellular telephone user to identify himself or herself while obtaining wirelessly from an airline computer an electronic bar coded boarding pass at the airport using only a cellular telephone. As proposed, the electronic boarding pass may be displayed as a bar code at the time of boarding on the screen of the cellular telephone so that the gate attendant may scan the boarding pass in a conventional manner.

BRIEF SUMMARY OF THE INVENTION

The present invention includes a system, method, and apparatus for communicating information encoded in a light-based signal from a fob device.

One method of communicating transmission information data in a light-based signal from a fob device includes encoding the transmission information data into bar code format encoded data, generating a signal from the bar code format to simulate a reflection of a scanning beam being moved across a static visual image of the bar code format, and actively transmitting the signal as light pulses from a fob device.

A fob device may provide transmission information data encoded in a bar code format to a light-based data receiving device. The fob device includes a first program component and a light source. The first program component generates a signal from data encoded into a bar code format to simulate a reflection of a scanning beam being moved across a static visual image of the bar code format. The light source actively transmits the signal as light pulses from the fob device.

A system for providing transmission information data from a fob device to a light-based data receiving device includes a server, a transfer agent, and a fob device including a light source. The server provides the transmission information data. The transfer agent provides for communications between the server and the fob device. The fob device actively provides a signal as light pulses. The system encodes the transmission information data and generates a signal from the encoded data.

An alternative system for providing transmission information data to a light-based data receiving device includes a server, a light-based data receiving device operatively connected to the server, and a fob device. The fob device actively provides transmission information data as light pulses from a light source to the light-based data receiving device.

A fob device may also provide transmission information data encoded in a bar code format to a light-based data receiving device utilizing a generating means and a transmission means. The generating means generates a signal to simulate the reflection of a scanning beam being moved across a static visual image of a bar code format. The transmission means transmits the signal as light from a fob device.

A fob device may also include a scanner for scanning a bar code, a program component responsive to the scanner, and a transmitter. The program component generates a signal from the bar code, and the transmitter transmits the signal as light pulses.

A method of communicating commercial information data to a light-based receiving device is also provided. The method includes generating a signal from commercial information data and actively transmitting the signal as light pulses from a fob device.

A method of communicating transmission information data from a fob device may also include generating a first signal from a first encoded format, generating a second signal from a second encoded format, transmitting the first signal as light pulses from a fob device, and transmitting the second signal from the fob device.

DETAILED DESCRIPTION OF THE INVENTION

Figure 1A:
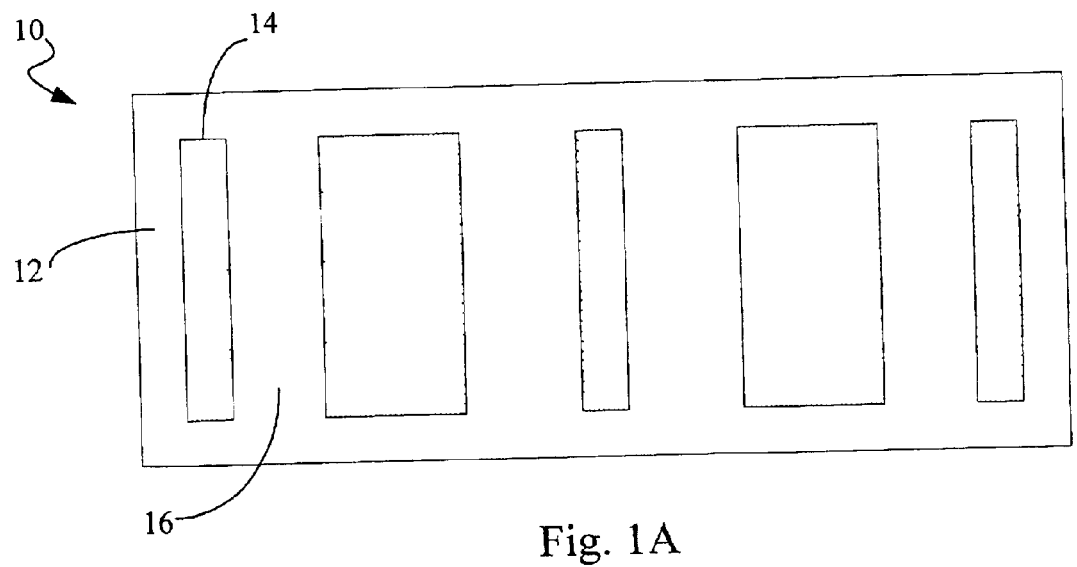
FIG. 1A is a depiction of a bar code.

U.S. patent application Ser. No. 09/963,218 entitled "System, Method and Apparatus for Communicating Information Between a Mobile Communications Device and a Bar Code Reader" filed on Sep. 25, 2001 by Nagesh Challa and Venkata T. Gobburu; U.S. patent application Ser. No. 09/963,298 entitled "Static Display of a Bar Code on a Display of a Mobile Communications Device" filed on Sep. 25, 2001 by Nagesh Challa and Venkata T. Gobburu; and U.S. patent application Ser. No. 09/996,847 entitled "Method and Apparatus for Acquiring, Maintaining, and Using Information to be Communicated in Bar Code Form with a Mobile Communications Device" filed on Nov. 19, 2001 by Venkata T. Gobburu, Krishnakumar Narayanan, Nagesh Challa, and Michel E. Gannage, are each incorporated herein by reference in their entirety.

A fob of the present invention is provided with the ability to communicate transmission information data. A fob is defined for the purposes of the present invention as a mobile electronic device that fits readily within a user's pocket or purse and preferably, but not necessarily, having a key ring attachment or a built-in key ring. The transmission information data may be any type of data that one may wish to communicate while at a facility equipped with a light-based data receiving device, such as a bar code scanner, including information conventionally communicated using bar codes, as well as other types of information that are not conventionally communicated using bar codes including, for example, lengthy information that is not conventionally communicated because of physical limitations imposed by a visual image of the bar code format. The transmission information data, for example, may include numeric, alphabetic, or alphanumeric data, an index, or other data values. The transmission information data may represent, for example, boarding pass information, e-ticket information, ticket information, coupon information, voucher information, credit card information, debit card information, automated teller machine card information, identification information, account information, electronic payment information, wire transfer information, purchase information, security information, affinity information, and so forth. Subsets of transmission information data may include, for example, commercial information data, identification information data, and so forth. Commercial information data, for example, may include boarding pass information, e-ticket information, ticket information, coupon information, voucher information, credit card information, debit card information, automated teller machine card information, account information, electronic payment information, wire transfer information, purchase information, and other commercial information used in commercial transactions. Identification information data may include identification, security information, affinity information, and so forth.

The transmission information data may be stored locally on the fob device, such as in volatile memory (e.g., random access memory ("RAM"), static or dynamic RAM ("SRAM" or "DRAM," respectively)), or in non-volatile memory (e.g., read only memory ("ROM"), electrically erasable programmable read only memory ("EEPROM"), FLASH memory), or any combination thereof. The transmission information data may be programmed into the device, entered into the device by the user, or automatically or manually furnished to the device from a remote source over any desired communication technology such as well known wireless transmission (e.g., wireless pager transmission, cellular transmission, IrDA), universal serial bus ("USB") transmission, parallel transmission, and serial transmission. The remote source may be a personal computer, a wireless operator, a server networked to the wireless operator, a peer networked to the wireless operator, a wireless data port, and so forth.

Transmission information can be communicated from the fob device to a fixed light-based data receiving device at a facility or to a portable light-based receiving device. The communication is accomplished by encoding the transmission information into a suitable format from which a signal may be generated and transmitted to the light-based data receiving device as light. One illustrative type of light-based communication is based on a bar code. FIG. 1A shows a bar code 10 that utilizes a series of vertical lines, i.e., bars 14, and spaces 16 to represent an identification code. Different combinations of the bars and spaces can be used to represent different characters.

One type of light-based data receiving device, a bar code scanner, uses a scanning beam, typically narrow band light in the visible spectrum such as red laser, but potentially any bandwidth of light in the visible or infrared spectra, to pass over a sequence of bars and spaces such as bar 14 and space 16 sequentially, e.g., left to right and/or right to left. Another type of bar code scanner is a wand scanner, which is swept across the bar code by a user to create the scanning beam. As the scanning beam of light scans across the bar code 10, the beam is at least partially reflected back to the scanner by the spaces 16 and is at least partially absorbed by the dark bars 14. A receiver, such as a photocell detector, in the bar code scanner receives the reflected beam and converts the beam into an electrical signal. As the beam scans across the bar code, the scanner typically creates a low electrical signal for the spaces 16, i.e., where the beam is reflected, and a high electrical signal for the bars 14, i.e., where the beam is absorbed. The scanner may, however, create a low electrical signal for the bars 14 and a high electrical signal for the spaces 16. The width of the elements determines the duration of the electrical signal. This signal is decoded by the scanner or by an external processor into characters that the bar code represents.

Figure 1B:
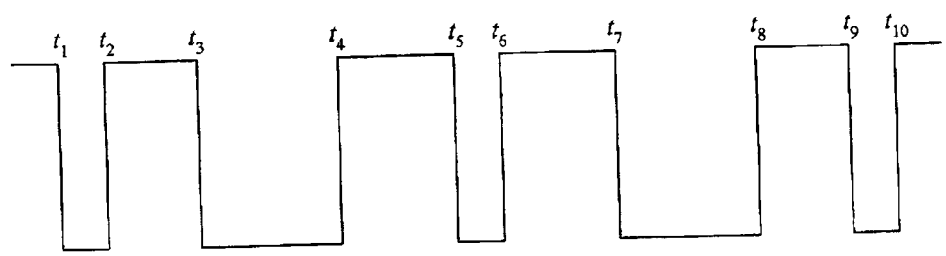
FIG. 1B is a graphical depiction of a signal representing the bar code of FIG. 1A for actively providing transmission information data to a bar code scanner.

In a bar code scanner, the contrast between the bar and space elements is used to distinguish the elements and decode the bar code. Transmission information data encoded in a bar code format may be actively provided to a bar code scanner by providing a light-based representation of a signal, such as shown in FIG. 1B, to a scanner instead of providing a static bar code image to the scanner. Since many bar code scanner receivers will receive visual wavelength signals, fob devices that have components that operate at these wavelengths can be used to provide an active light representation of the simulated reflected scanning beam to a bar code scanner. The transmission information data may thus be actively provided to current or improved bar code scanners without the requirement of altering the existing bar code scanner infrastructure.

When the bar code scanner receives the beam, the scanner decodes the on/off sequence of the beam to determine the transmission information data being provided, in a manner known in the art.

Sequentially providing such a signal to a bar code scanner further allows for the transmission of bar code information without the need for a device display or without regard to the physical size and/or resolution limitations of a device display. A bar code representation that might otherwise require an unreasonably wide screen to convey all the information to the scanner, for example, may be provided directly to the scanner in one step from a fob device having a very narrow screen or even no screen at all.

Further, a bar code displayed on an LCD screen such as on a PDA or cell phone, for example, has a lower contrast between the gray "off" state designating a space of the bar code and the black "on" state designating a bar than is available for a bar code printed on a black and white label. This lower contrast between the elements of the bar code can result in a lower reliability of the decoding process.

Figure 2:
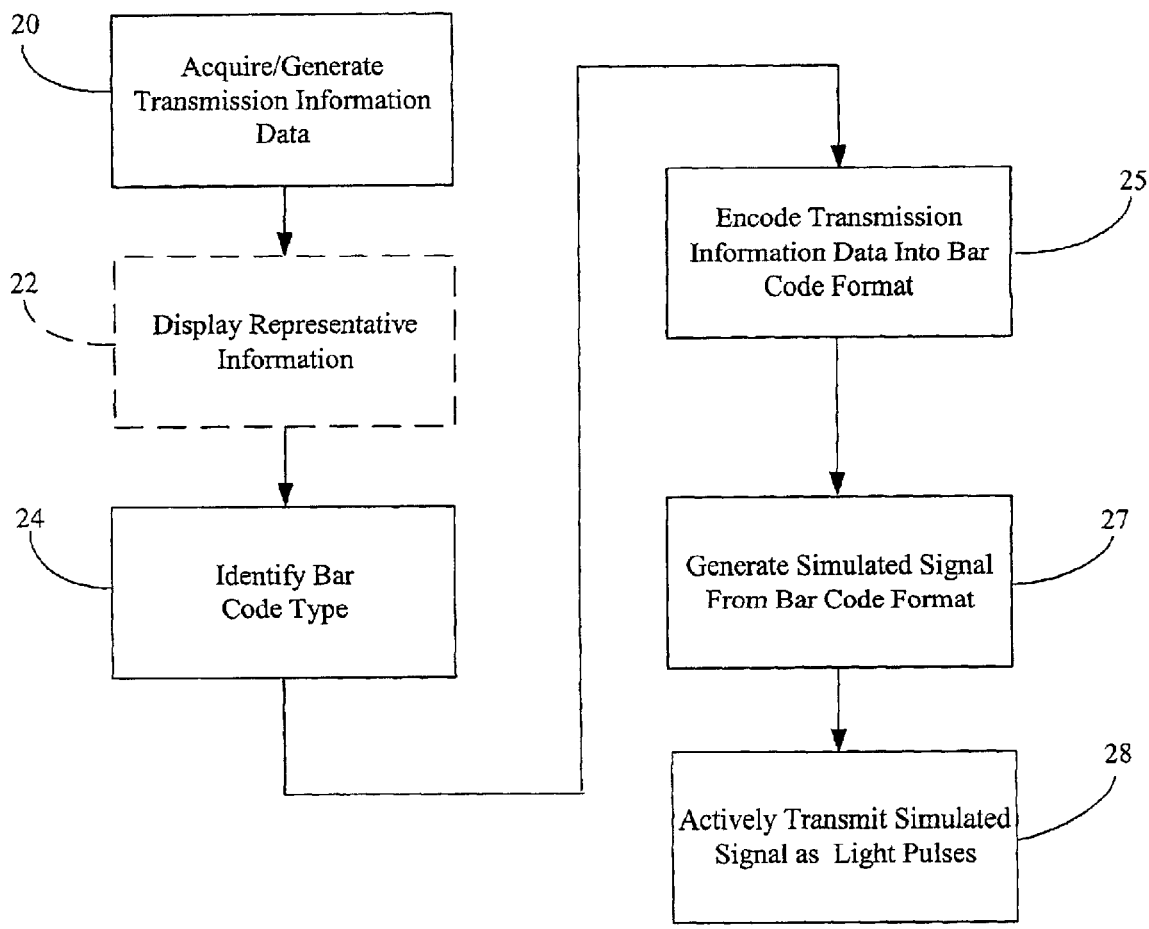
FIG. 2 is a flow chart of a method of actively providing transmission information data to a bar code scanner.

FIG. 2 shows a method of generating a signal for use with a bar code scanner that simulates a bar code with light pulses. The method of FIG. 2 is particularly useful for bar code scanners that use the reflection of a scanning beam being moved over a bar code. In block 20, transmission information data is acquired or generated.

Figure 13:
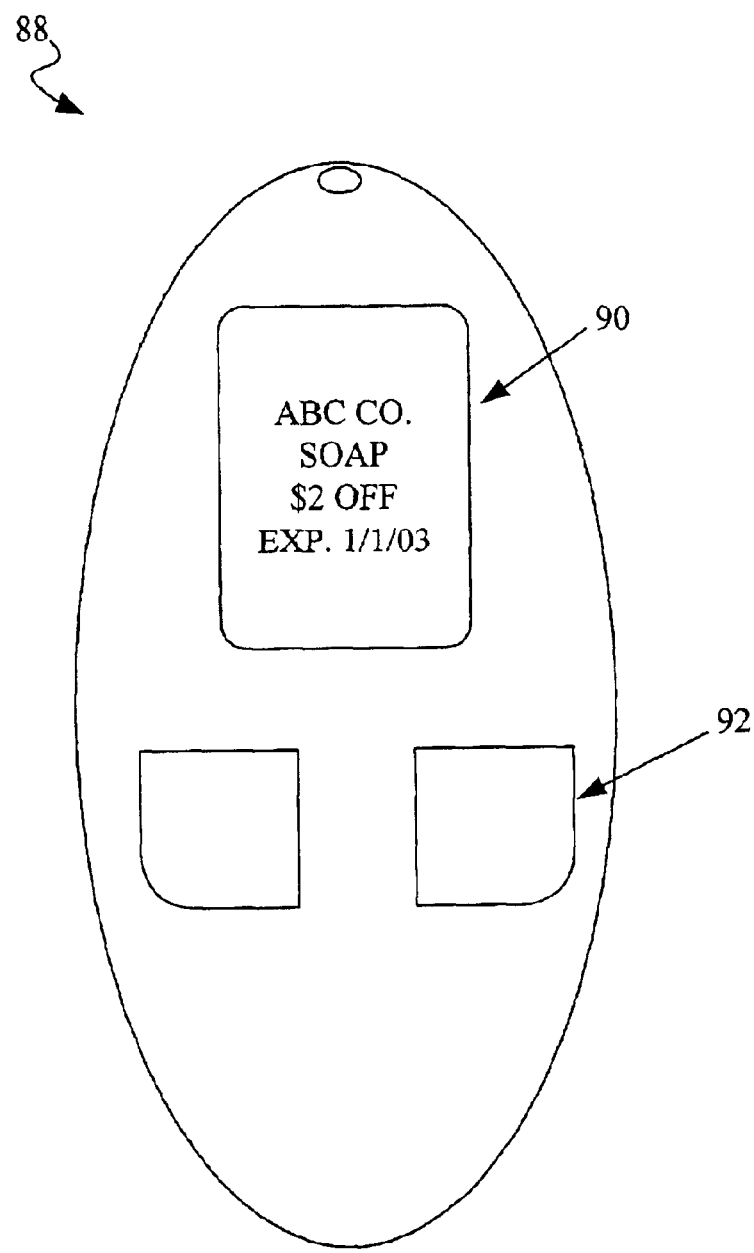
FIG. 13 is a pictorial representation of another embodiment of a fob device in which an output port is used to actively provide a signal representing transmission information data in a light-based signal.

In optional block 22, representative information for the transmission information data that will identify the transmission information data to a user of the fob device can be presented on an output facility of the device, if one is available. The output facility may include, for example, a display such as an LCD screen, a speaker, or any other output device for communicating with a user. The representative information may include the transmission information data itself, or may be other information that the user will associate with the transmission information data. In order to identify the desired transmission information data item, the representative information that will identify that transmission information data item may be rendered, for example, in a textual, numerical, and/or graphical form and displayed on a screen of a suitably equipped fob device, or an audio message that is played over a speaker of a suitably equipped fob device. In FIG. 13, for example, coupon information is displayed on a screen of a fob device identifying a product, a discount and an expiration date. In this manner, the user of the fob device can identify the transmission information data that is to be presented to the bar code scanner. If multiple transmission information data items are stored locally on the device and/or remotely retrieved, for example, the user can scan through them and select the appropriate transmission information data item to be presented to the bar code scanner.

In block 24, a bar code type is identified. The bar code type may be any type of bar code known in the art, such as, but not limited to, a UPC, EAN, Interleaved 2 of 5, Code 93, Code 128, and Code 39, or specially designed bar code types.

In block 25, the transmission information data is encoded into a bar code format for the identified bar code type. The bar code format may be represented, for example, by a binary array. In a typical single-dimensional bar code, for example, the smallest width of a bar or space element of a bar code may be designated as a single element of an array. If the bar code has a width of 256 dots or pixels, and the smallest element of the bar code has a width of 4 dots or pixels, for example, a binary array having sixty four array elements (e.g., a1, a2 . . . , a64) may be used to represent the bar code format. Each array element is assigned a value depending on whether that portion of the bar code is part of a bar or a space. A bar, for example, may be designated as having a value equal to one (e.g., a1=1), and a space may be designated as having a value equal to zero (e.g., a32=0). The array may also alternatively be a two-dimensional array, such as a bit map, that may be easily displayed on a screen. In yet another example, the transmission information data may be encoded into a digital series corresponding to a bar code representation of the bar code type selected in block 24. Alternatively, the transmission information data may be encoded into any number of other formats that may correspond to the selected bar code type identified in block 24. The bar code format may also be compressed or encrypted, such as when the bar code format is to be transmitted from a remote source to the fob device.

In block 27, a signal to simulate the reflection of a scanning beam being moved across a visual image of the bar code format of block 25 is generated from the bar code format. The simulated signal may be generated corresponding to an approximated or measured scanning rate. If the simulated signal is to be generated for a majority of the types of scanners in common use today, such as a laser scanner that utilizes a scanning rate in the range of about 30 to about 60 scans per second, the simulated signal may be generated using a scan rate within that range of scan rates (e.g., about 45 scans per second). The simulated signal may alternatively be generated using a variable scan rate that is swept throughout a range of scan rates. Alternatively, as described below with respect to an exemplary infrared transceiver, i.e., a transmitter/receiver pair, the scan rate of the scanning beam may be measured where a receiver is available to detect the scanning beam. In this case, once the scanning rate or rates are determined, the signal is generated in block 27 corresponding to this scan rate or rates.

In block 28, the simulated signal is transmitted as light pulses. For purposes of the present invention, the term "light" refers to visible light and infrared light spectra. The term "pulse" refers to a change in light level where the characteristics of the change are not critical. The light pulses may be generated in any visible or infrared wavelength desired by any light source known in the art, such as an LED, a laser, an infrared transmitter, a backlight of a small LCD screen, a small LCD or TFT screen, light bulb, or any other light source known in the art.

FIG. 1A shows a representative bar code 10. The bar code 10 includes a quiet zone 12, bars 14, and spaces 16. While FIG. 1A shows a quiet zone 12 being lighter, the quiet zone may alternatively be darker if the scanner is adapted to recognize it. Correspondingly, the bars 14 and the spaces 16 may be inverted such that the bars 14 are lighter than the spaces 16.

FIG. 1B shows an idealized representation of a signal generated in block 27 of FIG. 2 corresponding to the reflection of a scanning beam off a bar code 10 depicted in FIG. 1A. As a scanning beam scans across the quiet zone 12 and the spaces 16, the beam is reflected to the scanner. As the beam scans across the bars 14, however, the beam is absorbed (or at least the reflected beam has a lower amplitude than the beam reflected from the lighter quiet zone 12 and spaces 16). Thus, the amplitude of the beam received at the scanner decreases at times t1, t3, t5, t7, and t9, which correspond to the beam reaching a leading edge of a bar 14, and increases at time t2, t4, t6, t8, and t10, which correspond to the beam reaching the falling edge of a bar 14.

Figure 3:
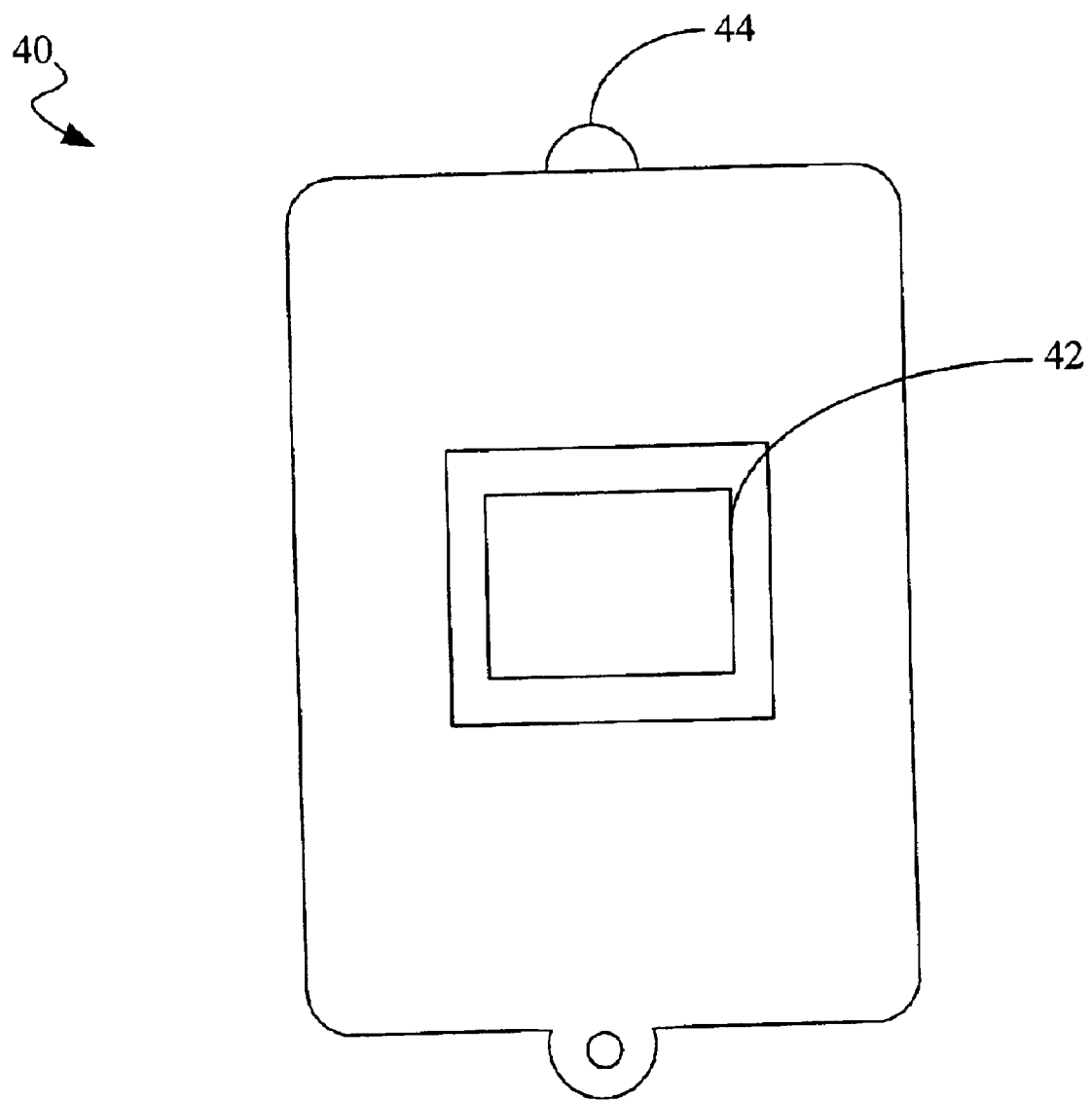
FIG. 3 is a pictorial representation of a fob device in which an output port is used to actively provide a light-based signal.

FIG. 3 shows a pictorial representation of one embodiment of a fob device 40. The fob device 40 may include a preprogrammed set of data that may be transmitted to a light-based data receiving device, such as a bar code scanner. The fob device 40, for example, may be distributed to customers and may include one or many different types of data such as a store affinity card identification code that a user may present to a retailer for discounts, promotional information data such as coupons, check cashing privileges, electronic payment and the like. As shown in FIG. 3, the fob device includes an activation component 42 and an output port 44. The activation component 42, for example, may be a button that a user may press to initiate the transmission of transmission information data to a bar code scanner. The output port 44, for example, may be an LED, a laser, an infrared transmitter, a backlight of a small LCD screen, a small LCD or TFT screen, a light bulb, or any other light source known in the art.

Figure 4:
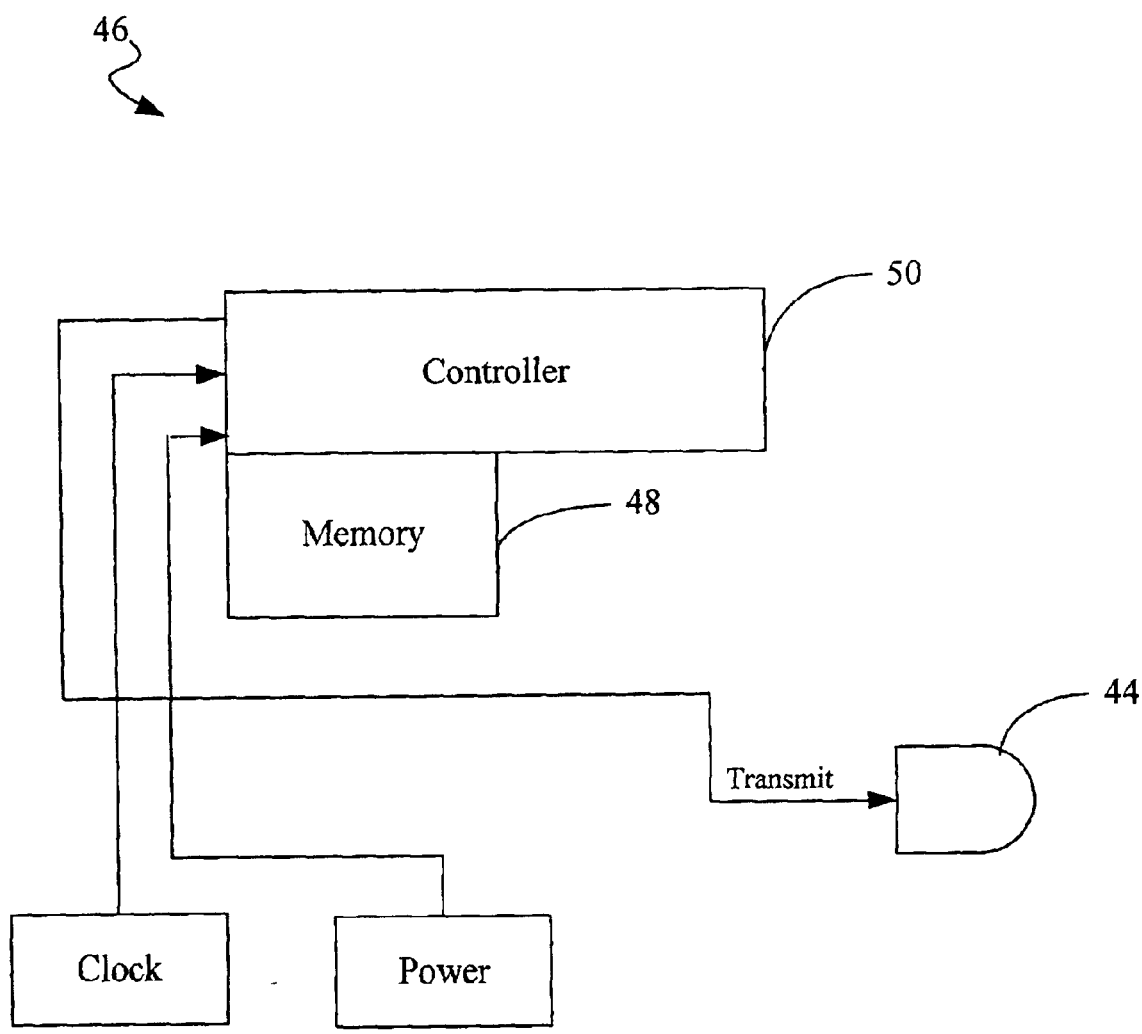
FIG. 4 is a schematic representation of a control circuit that may be used to control the operation of the fob device depicted in FIG. 3.

FIG. 4 shows a schematic representation of a basic circuit 46 that may be housed within a fob device 40, such as shown in FIG. 3, to transmit transmission information data stored within the fob device 40 to a light-based data receiving device within the scope of the present invention. The circuit 46 includes a memory 48 and a controller 50 that controls the output port 44. The memory 48, for example, may be volatile, non-volatile, or any combination thereof. In this embodiment, the controller 50 retrieves data from the memory 48 upon activation of the fob device 40. The data, for example, may be transmission information data, an encoded representation of the transmission information data to be transmitted to the bar code scanner, or may be a digital representation of a signal simulating the reflection of a scanning beam being moved across a visual image of a bar code corresponding to the transmission information data. If the memory 48 stores transmission information data, the memory 48 preferably also includes an encoding program, and the controller 50 encodes the data into a bar code format such as, for example, described above with respect to FIG. 2, where a conventional bar code scanner is the light-based data receiving device. The controller 50 also generates a signal simulating the reflection of a scanning beam being moved across a visual image of the bar code.

The controller 50 also drives the output port 44 to transmit the simulated signal as light pulses. The controller 50 may be implemented by any means known in the art, such as via a logic circuit, a microcontroller, a microprocessor, a combination of these elements, and the like. One commercially available microcontroller that may be used to implement the control circuit 46 of the present invention is an 8051 based microcontroller available from Philips semiconductors located in Eindhoven, The Netherlands. If the output port 44 is a light source, such as an LED, for example, the controller 50 may alternate the light source between on and off or between relatively bright and relatively dark settings in accordance with the simulated signal to simulate the movement of the reflection of a scanning beam across a conventional bar code. Thus, the light source may be set to its brightest setting for a duration corresponding to the time period during which the simulated scanning beam would transition from the falling edge of a bar to the leading edge of the next bar, and to its darkest setting for the duration corresponding to the time period during which the simulated scanning beam would transition from the leading edge to the falling edge of a bar. If the light source is capable of emitting different colors such as red and blue, the light source may be alternated between different colors to simulate a reflection from a visual image of the bar code format. Further, the fob device may include one or more light source, such as a laser and an LED, that provides different wavelengths of light to increase the compatibility of the fob device with different bar code scanners that use different wavelengths of light.

Software, including any programs, e.g., bar code format encoding algorithms, signal generating algorithms, any operating systems, drivers, e.g., display divers, keypad drivers, USB drivers, DTMF drivers, LED drivers, IR transceiver drivers, libraries, and communication stacks, e.g., IrDA stacks, are stored in the memory 48. The memory 48 may also be used for storing data such as identification information, configuration information, and the like. The memory 48 also provides memory for storage and execution of the program, such as data encoding and decoding algorithms. The clock may be implemented using an oscillator or a crystal and associated circuitry as is known in the art, and may, for example, be provided at a frequency of about 4 MHz. The power supply 68 may include a battery, e.g., 1.5 volts, and may further include regulation and, if needed, step up circuitry.

Figure 5:
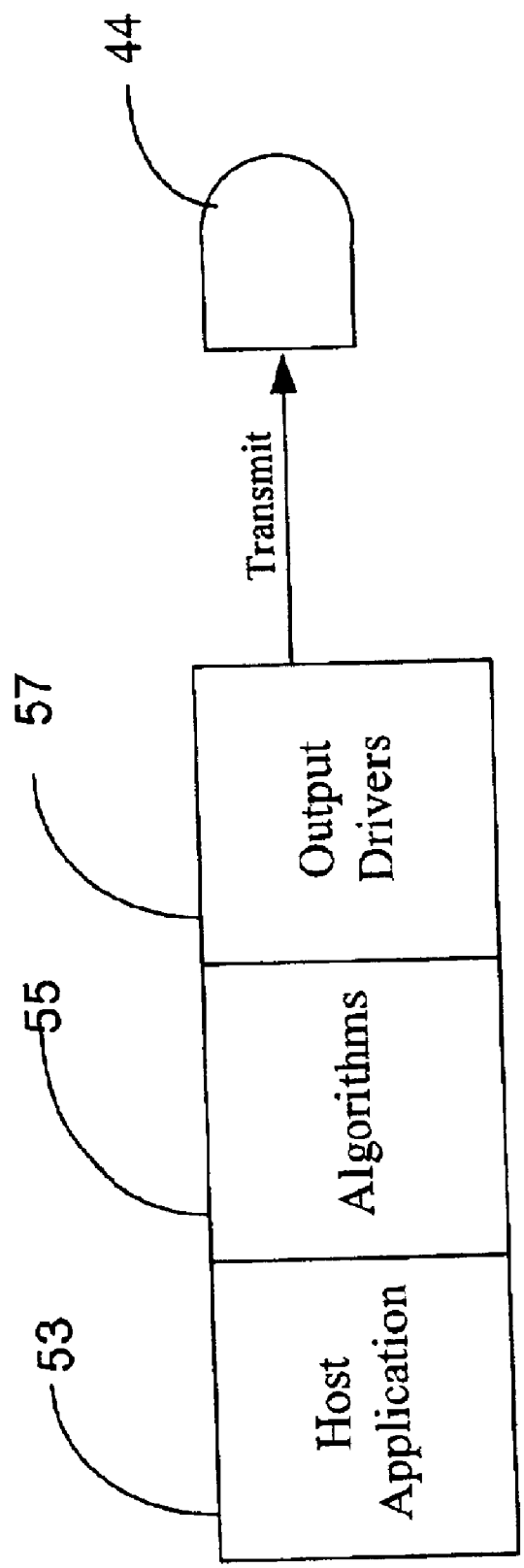
FIG. 5 shows a flow of transmission information data during operation of the control circuit shown in FIG. 4.

FIG. 5 shows one embodiment of a flow of transmission information data during operation of the control circuit 46 shown in FIG. 4. The software stored in the memory 48 includes a host application 53, encoding and signal generation algorithms 55, and drivers 57. The host application 53, for example, retrieves the transmission information data from the memory 48, manages the encoding and signal generation algorithms 55, and provides the generated signal to the output port 44. The output drivers 57 control the transmission of the generated signal by the output port 44, whether the output port 44 comprises an LED, a laser, an infrared transmitter, a backlight of a small LCD screen, a small LCD or TFT screen, light bulb, or other light source.

Figure 6:
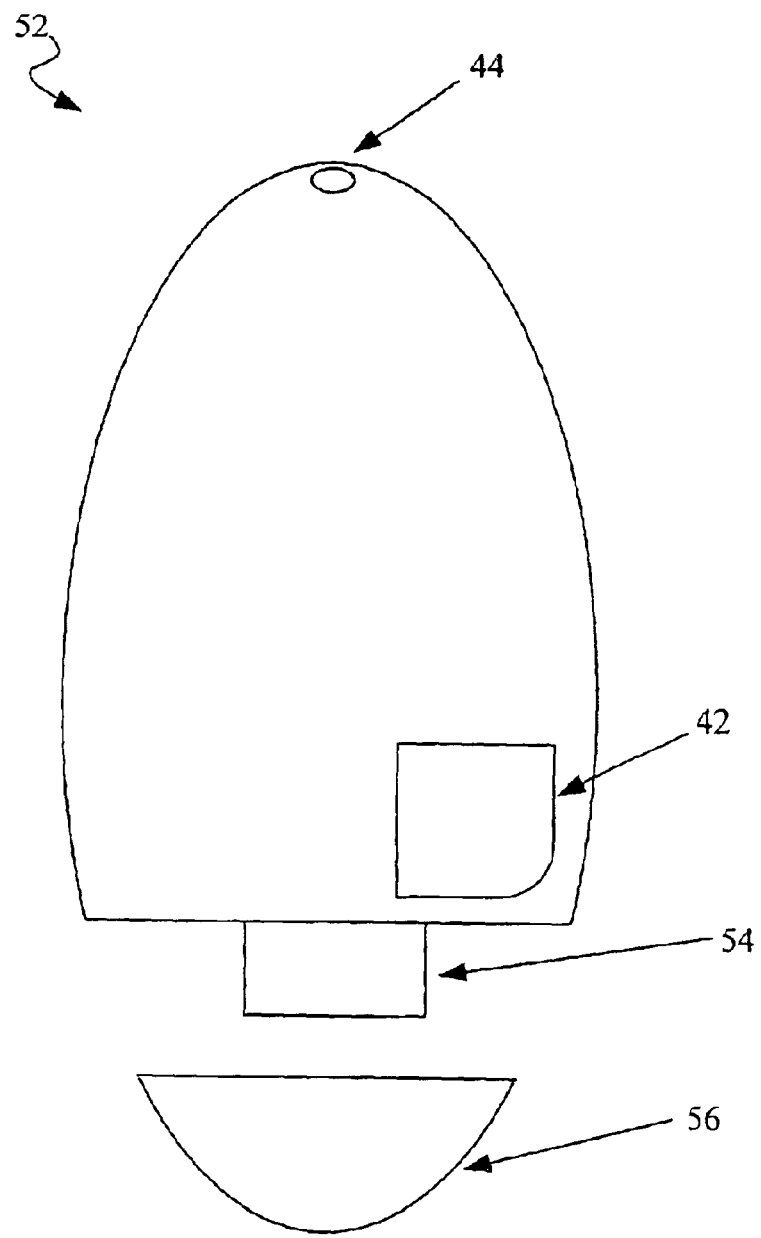
FIG. 6 is a pictorial representation of another fob device with a tethered input in which an output port is used to actively provide a signal representing transmission information data in a light-based signal.

An alternative embodiment of a fob device 52 that is able to receive transmission information data from an external source, such as a personal computer, a personal data assistant (PDA), a web-enabled wireless phone, or even another fob device, is shown in FIG. 6. Advantageously, in this embodiment, data may be added to the fob device 52 for transmission to a bar code scanner. Thus, in addition to preprogrammed data such as identification codes, the fob device 52 may be loaded with new information data. The user may load this information data into the fob device 52 via a tethered input port 54, and transmit the information to a bar code scanner via the output port 44. For example, a user may purchase an item such as a ticket to an event over the Internet and download a confirmation code from a web site to a personal computer, a PDA, a web-enabled wireless telephone, or the like. Then, the user transfers the confirmation code to the fob device 52. When the user arrives at the event, the user can simply transmit this confirmation code to a light-based data receiving device such as a bar code scanner at the entrance to the event without having to wait in line to purchase tickets, or even to pick up tickets such as at a will call window. Alternatively, the transmission information data may be e-mailed or otherwise provided to the user, and be loaded into the fob device 52 by the user via the input port 54.

The input port 54 may include a tethered input device, such as a USB port (as shown), an RS232 serial port, a parallel port, a dual tone modulated frequency receiver (DTMF) port. As shown in FIG. 6 for a USB connector, the fob device 52 may further include a cover 56 to protect the input port 54.

Figure 7:
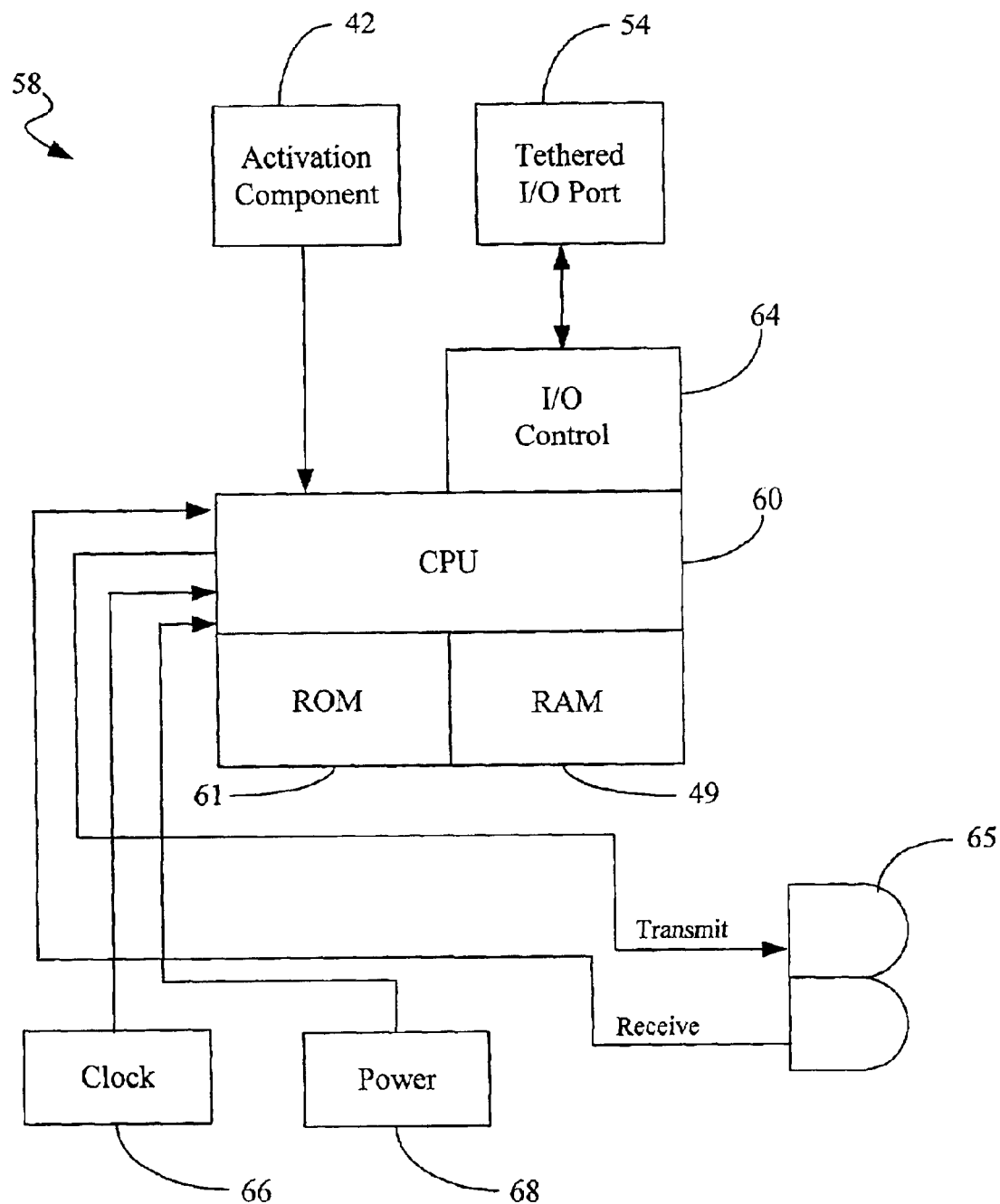
FIG. 7 is a schematic representation of a control circuit that may be used to control the operation of the fob device depicted in FIG. 6.

FIG. 7 shows a schematic representation of a circuit 58 for the fob device 52, such as shown in FIG. 6, to receive transmission information data and transmit that data to a bar code scanner. The circuit 58 includes a tethered input/output port 54 (e.g., a USB port, an RS232 serial port, a parallel port and so forth), an infrared transceiver 65, CPU 60, ROM 61, RAM 49, I/O control 64, clock 66, and a power supply 68. The circuit 58 may include preprogrammed transmission information data stored in ROM 61 or other nonvolatile memory, such as an EEPROM, and may further receive transmission data from an external device via the input/output port 54. User or device identification codes, for example, may be preprogrammed into the ROM 61 to identify the device and/or user, and/or to provide security. The CPU 60 receives the incoming data via the tethered input/output port 45 and stores the data in RAM 49 for possible encoding and retransmission to, for example, a bar code scanner. Upon activation via activation component 42, the CPU retrieves the stored transmission information data from the ROM 61 and/or the RAM 49, encodes the data into a bar code format, and generates a signal simulating the reflection of a scanning beam being moved across a visual image of a bar code corresponding to the transmission information data. The signal is then transmitted as light pulses via the infrared transceiver 65 to a bar code scanner.

Figure 8:
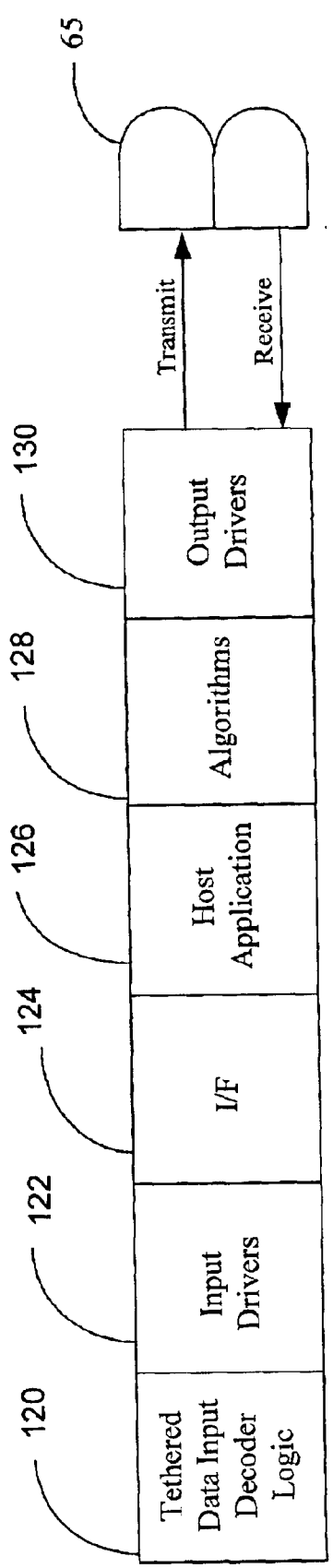
FIG. 8 shows a flow of transmission information data during operation of the control circuit shown in FIG. 7.

FIG. 8 shows one embodiment of a flow of transmission information data from an input to an output during operation of the control circuit 58 shown in FIG. 7. The tethered data input decoder logic 120 could include, for example, one or more of the following: a USB controller, an Internet controller, an RS232 controller and the like. The software stored in the ROM 61 includes input drivers 122, an interface 124, a host application 126, encoding and signal generation algorithms 128, and output drivers 130. In this embodiment, the input drivers control the I/O port 54 to receive data, and the data input decoder logic 120 encodes/decodes the signal exchanged by the I/O port 54. As described above, the I/O port 54 may include a tethered input device such as a USB port (shown in FIG. 6), a serial port, a parallel port, a DTMF receiver port, and the like. The input drivers 122, for example, may include USB, RS232, and/or DTMF driver software. The host application 126 then stores the received data in the RAM 49 for transmission via a transceiver 65.

When the activation component 42 is activated, the host application 126 retrieves the transmission data from the RAM 49, manages the encoding and signal generation algorithms 128, and provides the generated signal to the transceiver 65. The output drivers 130 control the transmission information of the transmission data from the transceiver 65.

Figure 9:
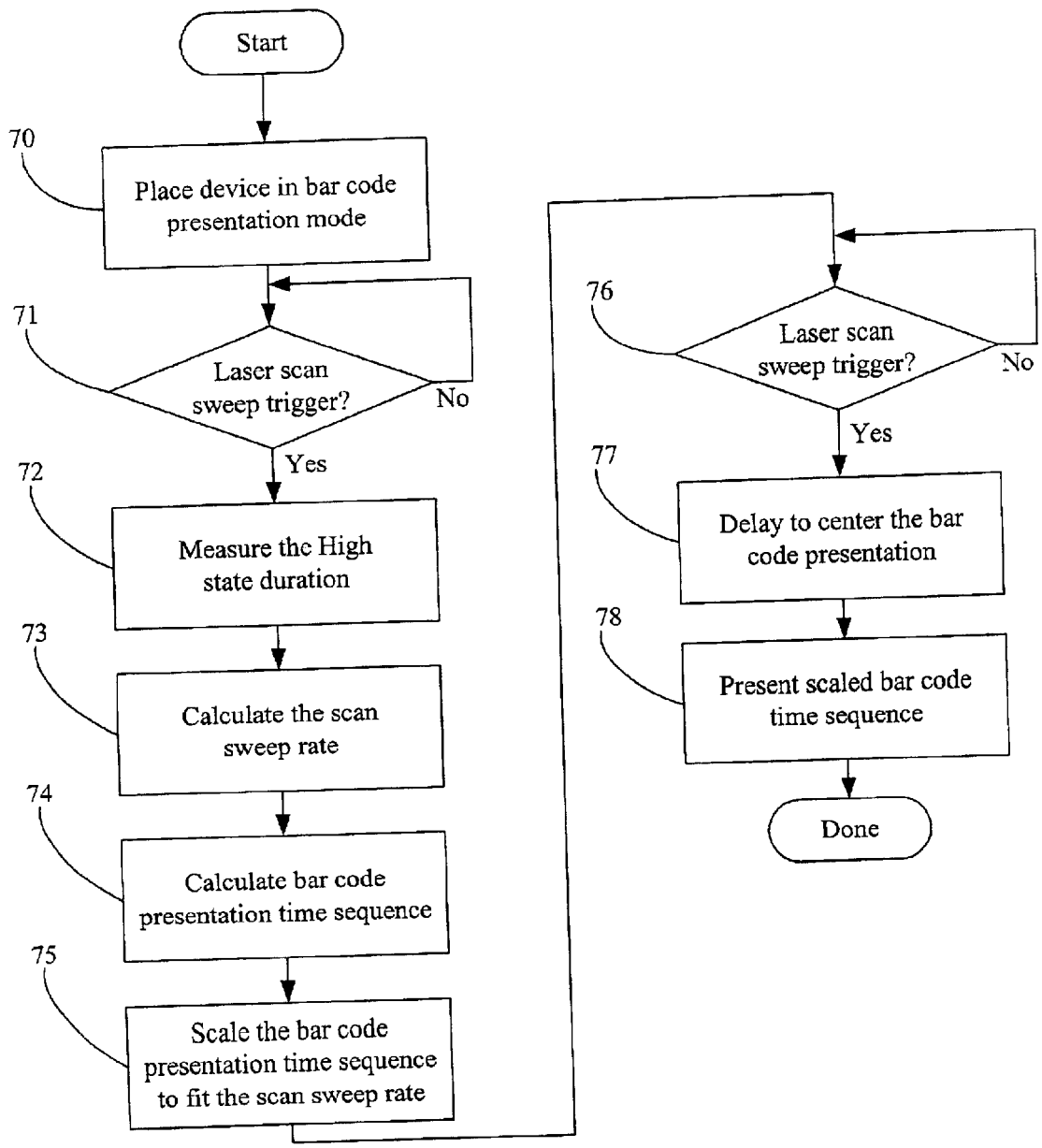
FIG. 9 is a flow chart of a method of synchronizing an active presentation of transmission information data to a scan sweep of a bar code scanner.

The infrared transceiver 65, may also be used to detect the scan rate of a bar code scanner beam over one or more scan cycles such as shown in FIG. 9. The fob device 52 may then calculate the scan rate of the beam and synchronize its transmission of a simulated reflected scanning beam to the scanner. If no beam is detected, a default scan rate may be used. If the transceiver 65 is not dedicated to the presentation of bar code information for the fob device and the device cannot distinguish the scanning beam from other transmissions, the fob device is placed in a bar code presentation mode in block 70. In this mode, when a scanning beam of a bar code scanner is detected in block 71 at the receiver of the transceiver 65 of the device, an interrupt trigger is generated indicating the start of the scanning beam sweep. If a signal at a pin of the CPU 60 is normally low (logical state) when no signal is detected and high when a signal is detected at the receiver, the CPU 60 monitors the receiver and determines the duration that the pin stays at the high logical state in block 72. This time corresponds to one scanner sweep. The CPU 60 can determine the scan rate from the duration of one scan sweep in block 73. For example, a scan sweep of about 33 milliseconds corresponds to a scan rate of about 30 scans per second and a scan sweep of about 10 milliseconds corresponds to a scan rate of about 100 scans per second. The CPU 60 also calculates the time sequence of the scan sweep that corresponds to the leading and ending quiet zones 12, and the bar code data zone in block 74. This time sequence is scaled for presenting the simulated reflected scanning beam to the scanner in one scan sweep in block 75. When another incoming trigger is detected corresponding to the start of a new scan sweep in block 76, the CPU 60 delays the start of block 78 to center the presentation of bar code data in the scan sweep of the scanner, and the simulated reflection of the scanning beam corresponding to the bar code is transmitted via the transmitter of the transceiver 65 in block 78.

Figure 10:
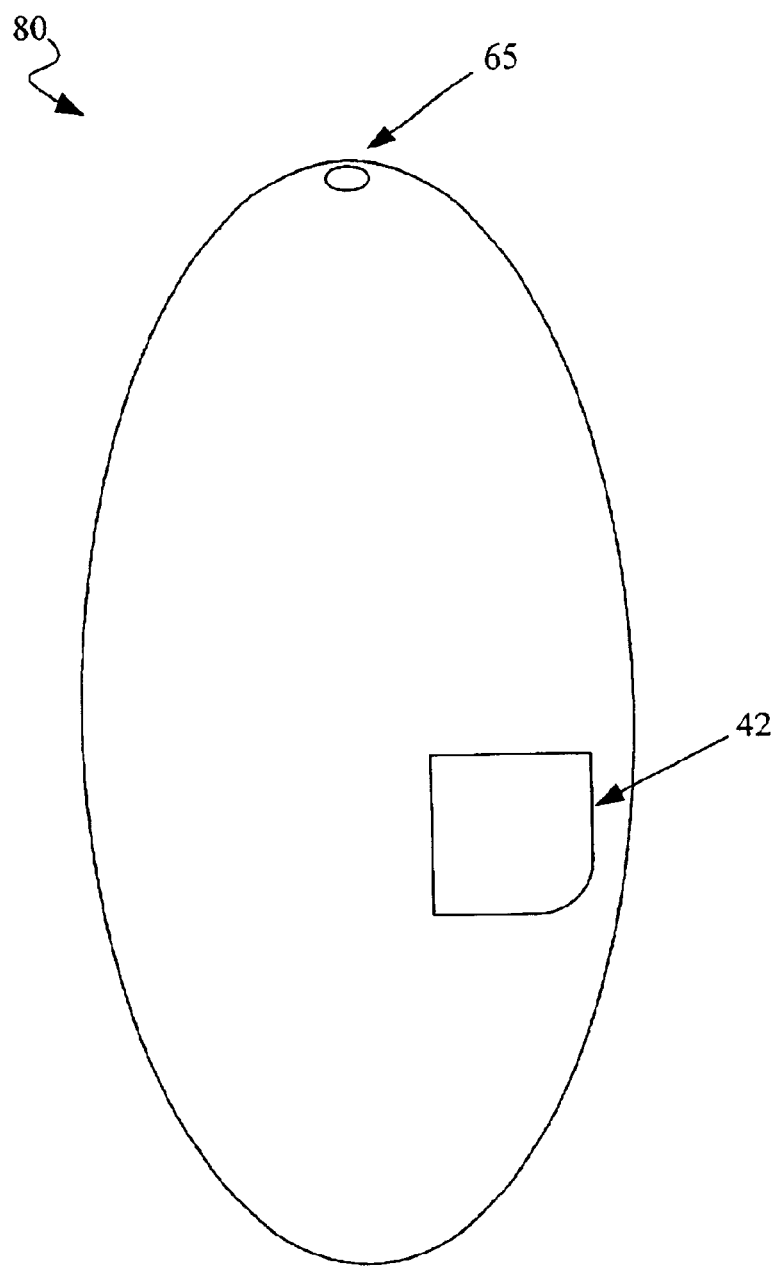
FIG. 10 is a pictorial representation of yet another fob device with an untethered input in which an output port is used to actively provide a signal representing transmission information data in a light-based signal.

FIG. 10 shows an alternative embodiment of a fob device 80 that not only provides for transmission of data to a bar code scanner but also provides for transmission and reception of data through an untethered I/O port for short range wireless communications such as an IR port or a Bluetooth™ port. The infrared transceiver 65 includes a transmitter component 67 and a receiver component 69, shown in FIG. 11, that may transmit and receive data in one or more communication protocols, such as IrDA for an infrared transceiver. Thus, the fob device 80 may transmit data to and receive data from another device, such as a PDA, in one format (e.g., IrDA format) in addition to transmitting transmission information data to a bar code scanner in another format (e.g., bar code format).

In one embodiment, for example the fob device 80 may provide electronic payment information at a point-of-sale. As fob devices evolve to incorporate new communications protocols and technologies, the user may use either the new protocols and technologies, or the communication of information in bar code form with light from his fob device at the point-of-sale, depending on the capabilities of the point-of-sale. An example of a proposed digital payment system based on infrared communications technology is infrared financial messaging ("IrFM"); see, e.g., H. R. Damon Gonzalez, Jr., Ronald J. Brown, and Lawrence Faulkner, Creating an End-to-End Digital Payment System, Oct. 15, 1999. If the user's mobile communications device is enabled for IrFM but the point-of-sale is not, the user may instead communicate his financial information in bar code form with light from his mobile communications device since the point-of-sale is likely to have a bar code scanner.

Figure 11:
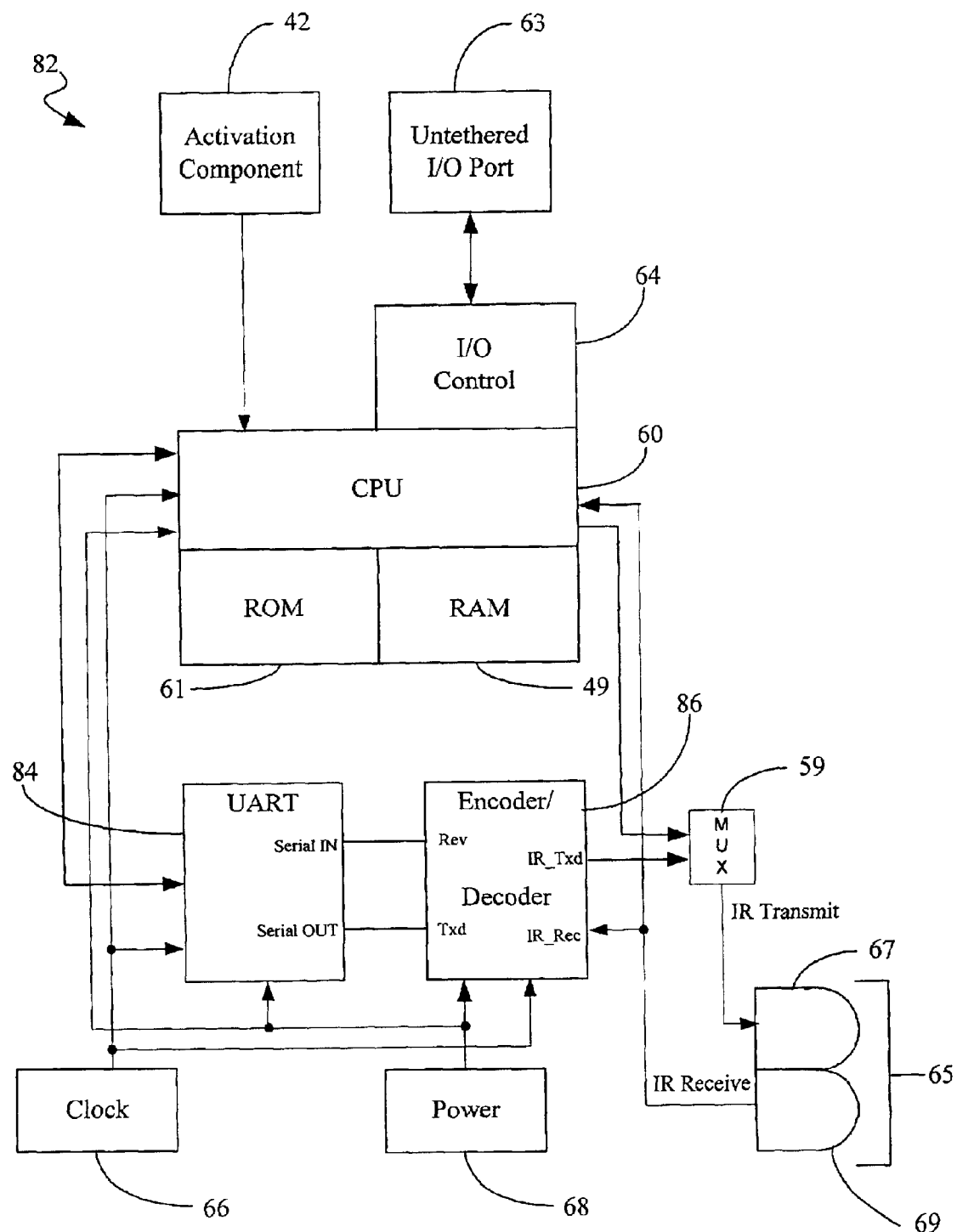
FIG. 11 is a schematic representation of a control circuit that may be used to control the operation of the fob device depicted in FIG. 10.

A control circuit 82 for the fob device 80 of FIG. 10 is shown in FIG. 11. The circuit 82 includes the CPU 60, activation component 42, I/O control 64, untethered I/O port 63, ROM 61, RAM 49, UART 84, an IrDA encoder/decoder 86, a multiplexer 59, clock 66, and power supply 68. In this embodiment, data may be received via the receiver component 69 of the transceiver 65 in IrDA format. The data is decoded by the encoder/decoder 86 and stripped of start and stop bit information by the UART 84. The data is then provided to the CPU 60 for storage in the RAM 49. Alternatively, the data may be received via the I/O port 63, under the control of the I/O control 64, and stored in the RAM by the CPU 60. The I/O port 63, for example, may be a radio frequency interface operating using a Bluetooth™ protocol. Data to be transmitted in IrDA communication protocol to an IrDA compliant receiver, for example, is retrieved from the ROM 61 and/or the RAM 49, transferred to the UART 84 to add stop and start bit information, and then transferred to the encoder/decoder 86 for encoding into the proper IrDA format for transmission via the multiplexer 59 and the transmitter component 67 of the transceiver 65.

The control circuit 82 further controls the transmission of transmission information data to a bar code scanner as described above with reference to FIG. 7. As shown in FIG. 11, the CPU 60 directly controls the transmitter component 67 of the transceiver 65 via the multiplexer 59, which selects the source of the output signal to be transmitted via the transmitter component 67 of the transceiver 65. This allows the CPU 60 to encode transmission information data in bar code format for transmission to a bar code scanner as described above with reference to FIG. 2, and to provide that encoded data directly to the transmitter component 67 of the transceiver 65.

If desired, the CPU may also respond to the receiver component 69 to allow the process of FIG. 9 to be carried out.

Figure 12:
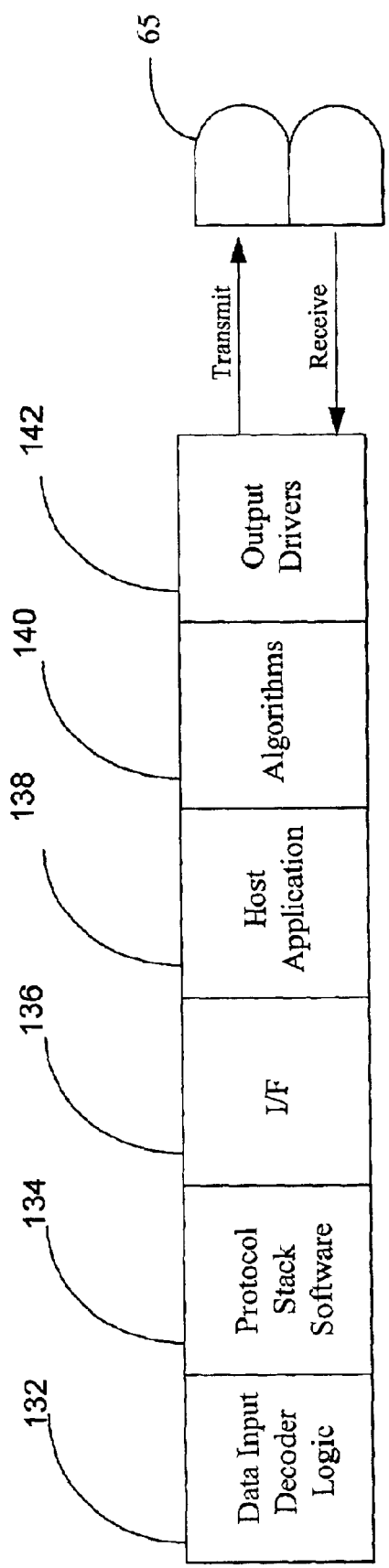
FIG. 12 shows a flow of transmission information data during operation of the control circuit shown in FIG. 11.

FIG. 12 shows one embodiment of a flow of transmission information data from an input to an output during operation of the control circuit 82 shown in FIG. 11. The input decoder logic 132 can include, for example, an untethered I/O interface controller such as in IrDA controller for receiving infrared signals from the receiver component 69 of the transceiver 65, or a Bluetooth™ controller for receiving radio frequency signals. The software stored in the ROM 61 includes protocol stack software 134, an interface 136, a host application 138, encoding and signal generation algorithms 140, and output drivers 142. In this embodiment, the protocol stack software encodes/decodes the data from the I/O port 63 or the receiver component 69 of the transceiver 65. As described above, the transceiver 65 may include, for example, an infrared transceiver, and the software may receive data encoded in an IrDA infrared protocol. The control circuit may also exchange data via the I/O interface such as data encoded in a Bluetooth™ radio frequency protocol, respectively. The host application 138 then stores the received data in the RAM 49 for transmission via the transceiver 65.

When the activation component 42 is activated, the host application 138 retrieves the data from the RAM 49, manages the encoding and signal generation algorithms 140, and provides the generated signal (e.g., transmission information data in bar code form) to the transceiver 65 via the multiplexer 59 (shown in FIG. 11). The output drivers 142 control the transmission of the generated signal by the transceiver 65. As described above, the transmission information data is transferred directly from the CPU 60 to the transmitter component 67 of the transceiver 65 via the multiplexer 59 to a light-based data receiving device, such as to a bar code scanner. Alternatively, the CPU 60 may retrieve the transmission information data from ROM 61 and/or RAM 49 and pass the transmission information data to the UART 84 and the encoder/decoder 86 for transmission via the transceiver 65 in another protocol such as IrDA.

As shown in FIG. 13, the fob device 88 may further include a small display screen 90 and a small key pad 92. The display screen may be used to display representative information, such as shown in block 22 of FIG. 2, to identify particular transmission information data to a user. The key pad 92 may be used to scroll through individual data codes to find the particular transmission information data that the user wishes to transmit to a particular bar code scanner. Thus, the fob device 88 may store multiple different pieces of information, such as coupons, an admission ticket, and credit card information, and so forth that may be selected and transmitted to one or more bar code scanners at different times, as desired by the user.

The display screen 90 may also, or alternatively, be used to display static visual image of a bar code or other representative image. The display screen 90 may be used to display a short bar code for communicating conventionally with a bar code scanner. Further, a high resolution display, for example, may be used to display a high density representative image, such as, but not limited to a two-dimensional bar code. The high density image may be read by a scanner, such as a charge coupled device (CCD) scanner. In this manner, the fob device 88 may be able to communicate with a light-based data receiving device by actively transmitting the signal as light pulses in a first mode, and/or with another device, such as, but not limited to, a CCD scanner in a second mode.

Figure 14:
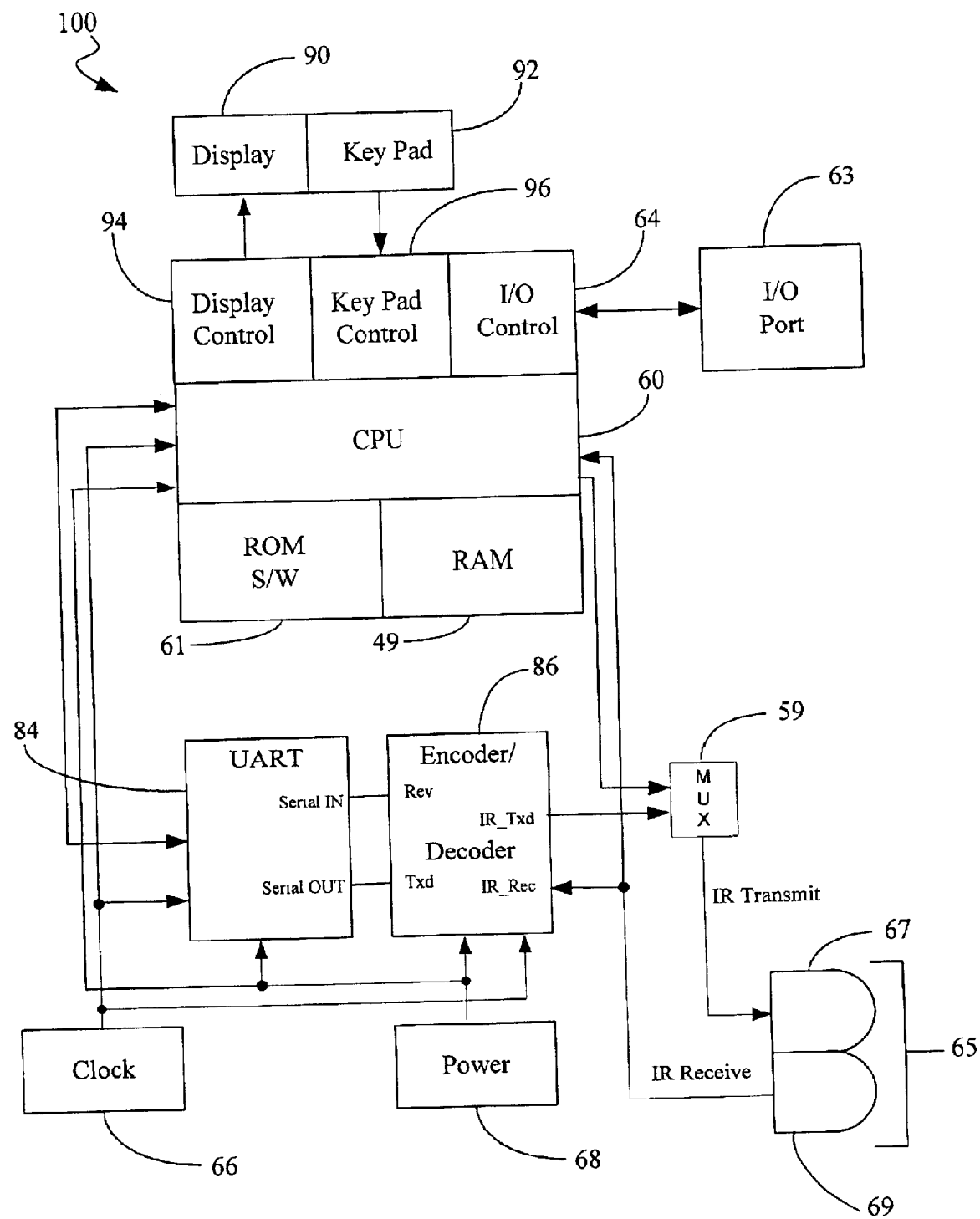
FIG. 14 is a schematic representation of a control circuit that may be used to control the operation of the fob device depicted in FIG. 13.

FIG. 14 shows a schematic representation of a control circuit 100 that may be used to control the operation of the fob device 88 shown in FIG. 13. The control circuit includes the same operations as described above with reference to FIGS. 7 and 11, but further includes display control 94 and key pad control 96 elements. The display control 94 and key pad control 96 elements of the control circuit 100 operate as known in the art to cause display of representative information for each of the transmission information data codes stored on the fob device 88, to scroll through each of the codes, and to select a particular code for transmission to a bar code scanner.

The fob device 88 may include graphic or text information stored in ROM 61 or RAM 49 that may be displayed upon receipt or transmission of transmission information data. A coupon, for example, may be transmitted including the UPC bar code information for a product. The manufacturer identification code may be extracted from the UPC. The identification code, for example, may be used to retrieve a logo, textual identification or other identification information from the memory of the fob device 88, and the identification information may be displayed on the display 90 of the fob device 88.

In an alternative embodiment, the display 90 of the fob device 88 shown in FIG. 13 may be used as the output port for transmission of transmission information data to a bar code scanner. In this embodiment, the display 90 may be alternated between on and off, or between relatively bright and relatively dark settings, or between different colors such as red and blue, to simulate the reflection of a scanning beam moving across a conventional bar code. Thus, the display 90, or at least a significant part thereof, may be set to its brightest setting for a duration corresponding to the time period during which the simulated scanning beam would transition from the following edge of one bar to the leading edge of the next bar, and to its darkest setting for the duration corresponding to the time period during which the simulated scanning beam would transition from the leading edge to the following edge of a bar. Alternatively, any aspect of the display that may be changed and recognized by a bar code scanner receiver may be utilized. A display backlight, for example, may be turned on and off to provide the simulated scanning beam signal to the receiver. In some instances, combining the techniques may be most effective. For example, reflected light may be simulated by a white screen with a backlight on, while absorbed light may be simulated by a dark screen with a backlight off.

In one approach, the brightness and/or contrast of the display may be adjusted in order to increase the reliability of a transmission process. The device may, for example, automatically adjust the display to the maximum brightness and/or contrast when transmitting the simulated signal to a bar code scanner. In another embodiment where the display 90 of the fob device 88 is a color display, at least one level of the simulated signal can be depicted in color. The different levels of the simulated signal, i.e., high and low, may be presented in colors preferably located at opposite ends of the visual light spectrum. In this embodiment, a scanner may accept one of the colors, but more effectively reject the other color. A simulated signal transmitted with red and blue colors corresponding to the different levels of the simulated signal, for example, may be more easily accepted by a particular bar code scanner than a simulated signal transmitted by black and gray elements of an LCD display.

The display 90 may be used to display the representative information of the transmission information data and to actively provide the transmission information data to a bar code scanner in various manners. For example, the display screen may display the representative information first and, after a prescribed time period or after the user changes the state of the fob device 88, such as by pressing a button, clear the display and begin to actively provide the transmission information data to the bar code scanner. If the fob is provided with a larger screen or a high resolution screen, which may require a customized bar code scanner, different portions of the display may be used to display the representative information data and to actively provide the transmission information data. The display may also be used to display the representative information and to simultaneously actively provide the transmission information data such as by flashing the back light, changing the colors, inverting the display, or other changes in the display characteristics.

Figure 15:
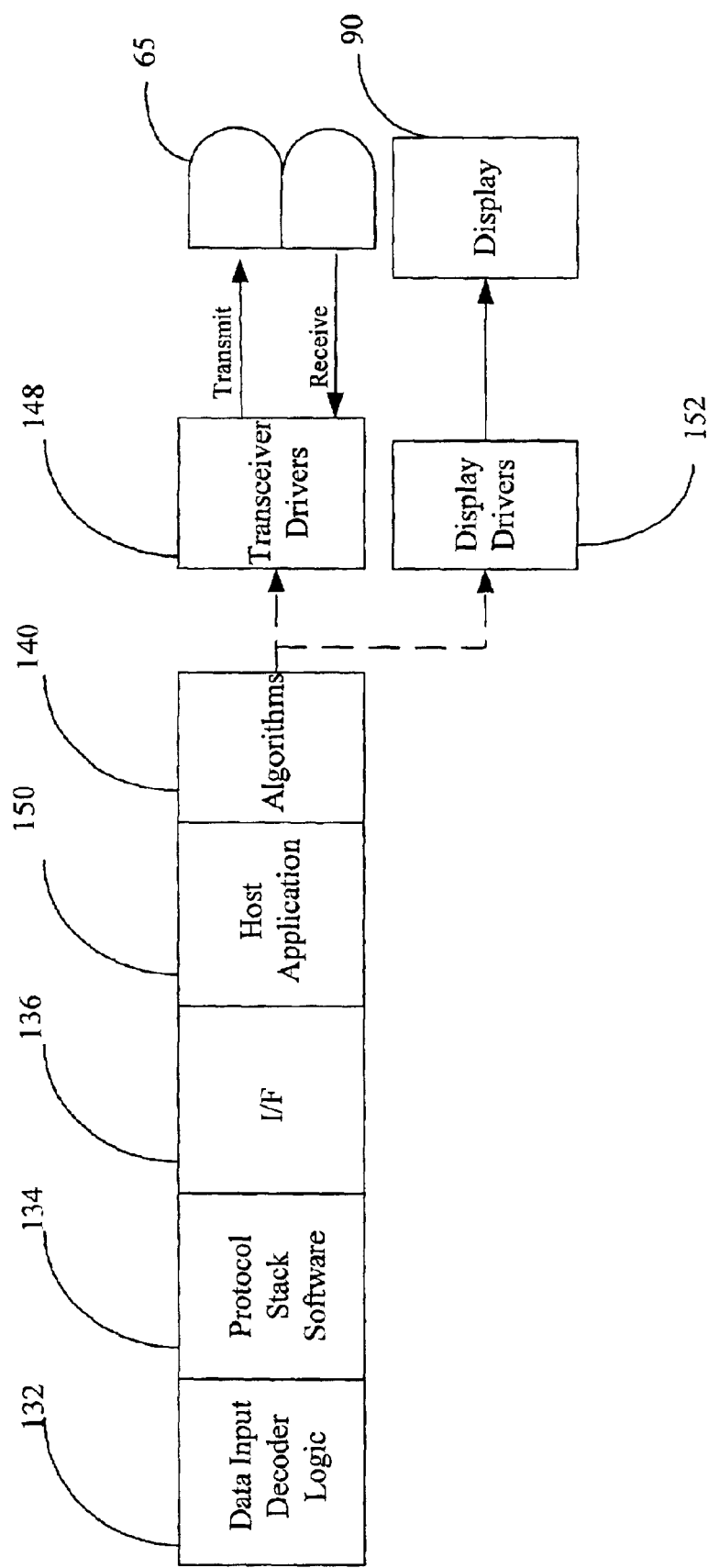
FIG. 15 shows a flow of transmission information data during operation of the control circuit shown in FIG. 14.

FIG. 15 shows one embodiment of a flow of transmission information data from an input to an output during operation of the control circuit 100 shown in FIG. 14. The software stored in the ROM 61 includes software that operates similar to that described in FIGS. 8 and 12, and further includes display drivers 152. The display drivers 152 control the use of the display 90 to transmit transmission information data in bar code form via display 90, as described in more detail above.

The host application 150 may further provide data management of the transmission information data and corresponding representative information, if desired. For example, the host application 150 may organize the transmission information data by categories such as, but not limited to, coupons, tickets, retailer, location, and the like. The various pieces of transmission information data, for example may be stored in different folders or files, and may be retrievable by category in order to make finding a particular piece of transmission information data easier.

Figure 16:
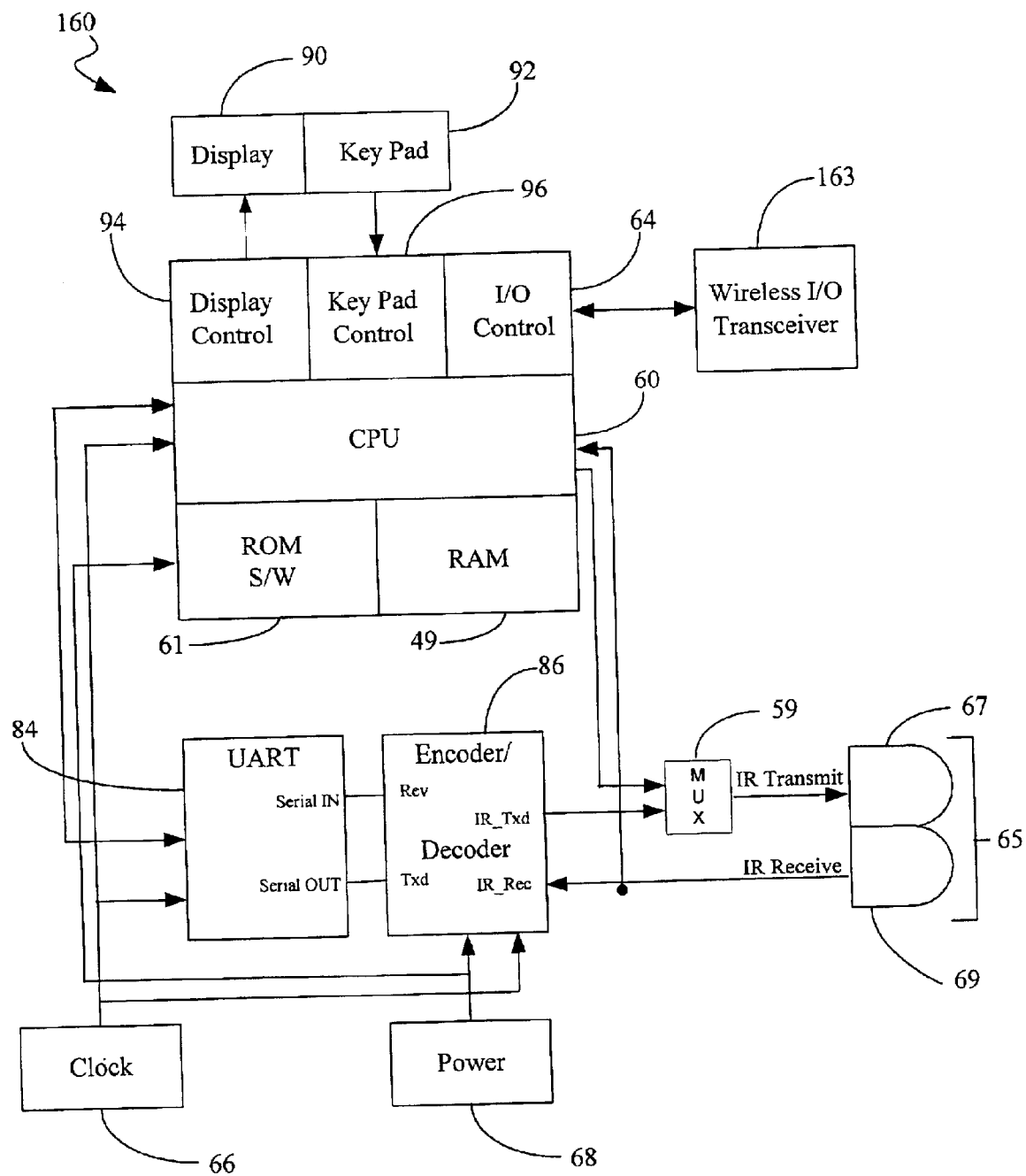
FIG. 16 is a schematic representation of an alternative control circuit that may be used to control the operation of the fob device depicted in FIG. 13.

FIG. 16 shows an alternative control circuit 160 that may be used in conjunction with a fob device. In this embodiment, the control circuit 160 further includes a wireless input circuit such as a wireless I/O transceiver 163. Thus, the fob device may be able to directly receive information data via a wireless message. Thus, if a user orders a ticket over the phone, the retailer can send a confirmation code via a wireless message, such as, but not limited to, a wireless paging message (e.g., transmitted using Motorola's FLEX™ or ReFLEX™ protocol) or a wireless cellular message (e.g., transmitted using for example an Short Message Service (SMS) or a Wireless Access Protocol (WAP) push on cellular networks such as a GSM, CDMA, TDMA, CDPD, UMTS, or WCDMA networks). The user can later transmit this confirmation code at the entrance to an event without having to retrieve the information and load it into the fob device. Further, if the wireless I/O transceiver 163 of the fob device control circuit 160 includes a two-way cellular transceiver or paging transceiver, such as with a commercially available transceiver operating under Motorola's ReFLEX™ communication protocol, the user may also request transmission information data, such as coupons for a store in which the user is shopping, be delivered via a wireless message to the fob device from a wireless host such as described below with reference to FIG. 17. Alternatively, the control circuit may be implemented by a commercially available one-way wireless I/O transceiver such as paging transceiver operating under Motorola's FLEX™ communication protocol. Once the messages are received, the controller can extract the transmission information data from the message and encode it into a bar code format, generate a signal simulating the reflection of a scanning beam being moved across a visual image of the bar code format, and actively transmit the simulated signal as light pulses as described above with reference to FIG. 2. The control circuit 160, for example, may be adapted to receive transmission information via wireless transmission from a host, client, or operator system such as described below with reference to FIG. 25.

One example of a fob device including a control circuit having a wireless transceiver or receiver is a security fob. The fob device, for example may receive periodic regular, or irregular, encrypted or non-encrypted updates of security codes via wireless transmissions, or may wirelessly request and receive updated security codes. The updated security codes may then be presented by the fob device as light pulses to a light-based data receiving device, such as a bar code scanner, at an entry way to allow for access to a secure area.

As mobile communications devices evolve to incorporate new communications protocols and technologies, the user may use either the new protocols and technologies, or the communication of information in bar code form with light from his mobile communications device at the point-of-sale, depending on the capabilities of the point-of-sale. An example of a proposed digital payment system based on infrared communications technology is infrared financial messaging ("IrFM"); see, e.g., H. R. Damon Gonzalez, Jr., Ronald J. Brown, and Lawrence Faulkner, Creating an End-to-End Digital Payment System, Oct. 15, 1999. If the user's mobile communications device is enabled for IrFM but the point-of-sale is not, the user may instead communicate his financial information in bar code form with light from his mobile communications device since the point-of-sale is likely to have a bar code scanner.

Figure 17:
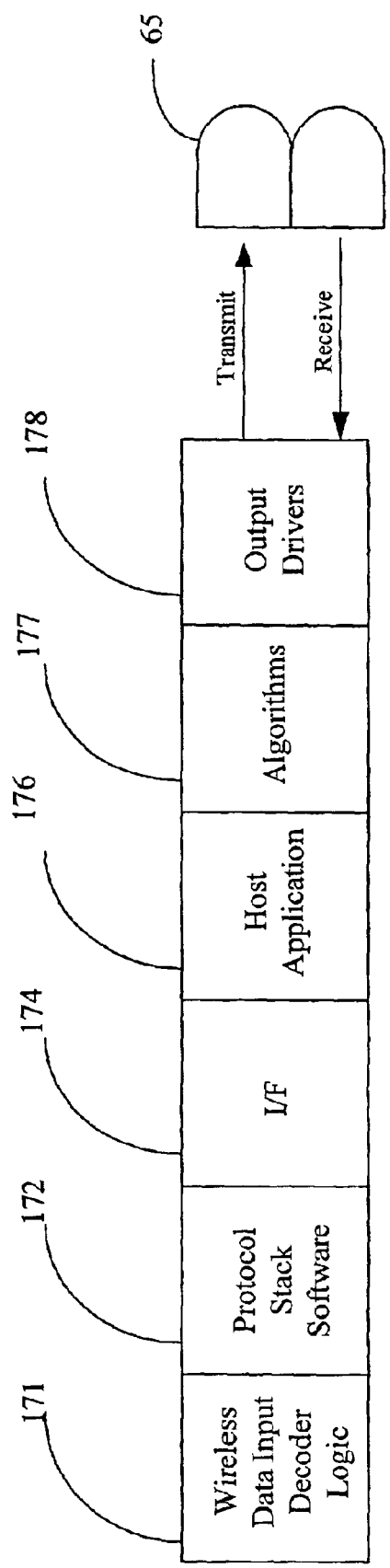
FIG. 17 shows a flow of transmission information data during operation of the control circuit shown in FIG. 16.

FIG. 17 shows one embodiment of a flow of transmission information data from an input to an output during operation of the control circuit 160 shown in FIG. 16. The wireless data input decoder logic 171 may include, for example a Motorola's FLEX™ or ReFLEX™ wireless pager controller chip set, a wireless cellular controller chip set (e.g., GSM, CDMA, TDMA, CDPD, UMTS, or WCDMA), or other wireless controllers known in the art. The software stored in ROM 61 includes protocol stack software 172, an interface 174, host application 176, encoding and signal generation algorithms 177, and transceiver drivers 178. The control circuit 160 exchanges data via the wireless transceiver 163. The data is encoded/decoded by the protocol stack software 172. The data may be exchanged or received by any suitable wireless transceiver or receiver known in the art such as by a wireless pager receiver, or a cellular receiver. Further, the data may be exchanged utilizing any suitable wireless protocol known in the art. In a wireless pager embodiment, for example, the data may be received by a pager network utilizing Motorola's FLEX™ or ReFLEX™ protocols. In a cellular embodiment, however, the data may be received by a cellular network utilizing protocols such as GSM, CDMA, TDMA, CDPD, UMTS and WCDMA. The host application 176 receives the decoded input data and stores it in the RAM 49 for transmission via the transceiver 65.

When the activation component 42 is activated, the host application 176 retrieves the data from the RAM 49, manages the encoding and signal generation algorithms 177, and provides the signal to the transceiver 65 for transmission, which is controlled by the transceiver drivers 178.

Figure 18:
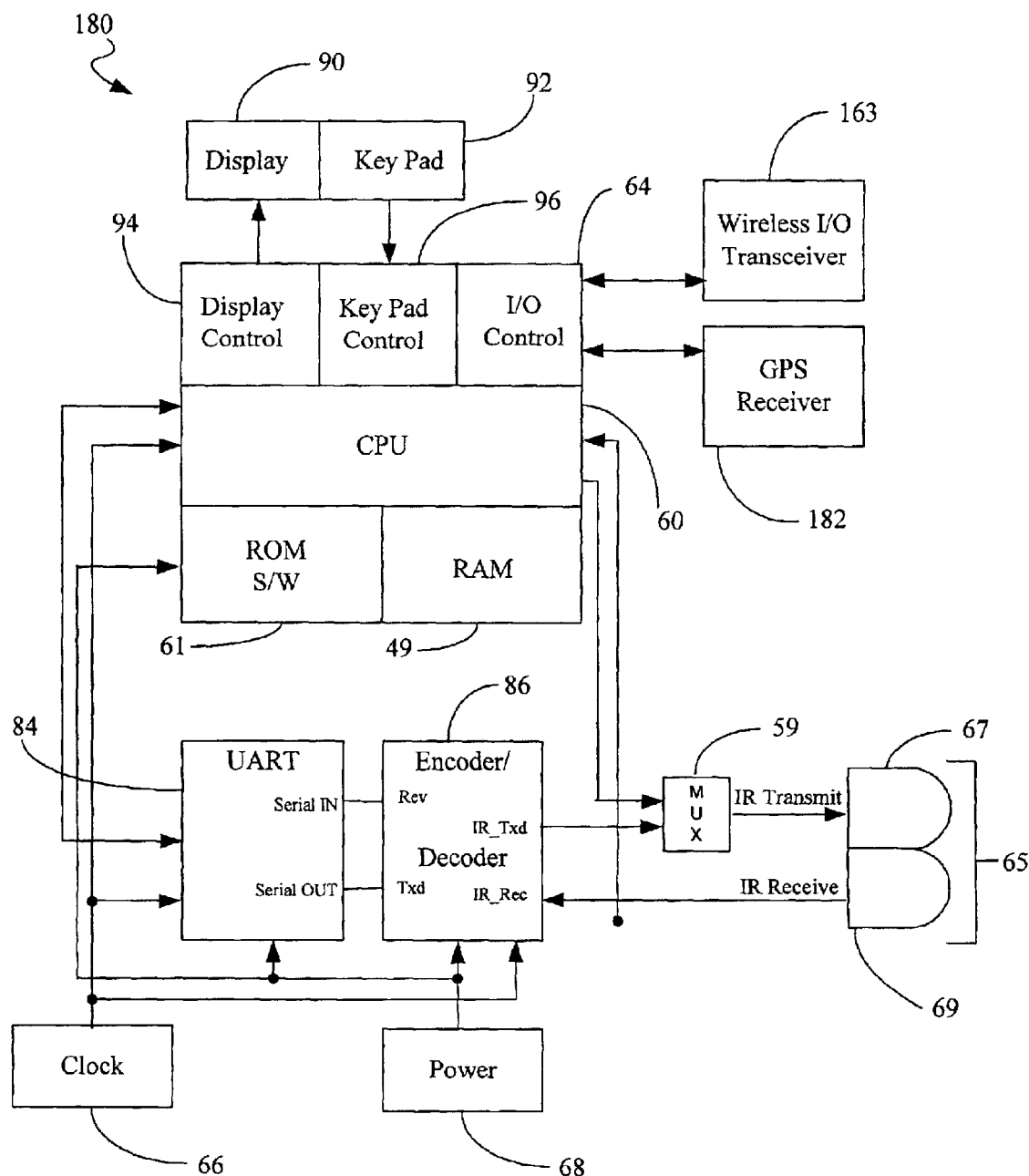
FIG. 18 is a schematic representation of yet another control circuit that may be used to control the operation of the fob device depicted in FIG. 13.

FIG. 18 shows a control circuit 170 that includes the elements of the control circuit 160 shown in FIG. 16 and further includes a ground positioning system (GPS) receiver to determine the location of the fob. The GPS receiver operates within the control circuit 180, described above, as is known in the art. In this embodiment, the two-way wireless I/O transceiver may further provide location information to the system 30 described below with reference to FIG. 25. The system 30 of FIG. 25 may then use this information to select appropriate transmission information data to be provided to the fob device. Alternatively, the control circuit 180 may utilize the location information to select or present to the user appropriate transmission information data from the ROM 61 or the RAM 49. In this case, the GPS receiver may also be used in conjunction with an embodiment such as the one described with reference to FIGS. 13–15, which does not require a wireless I/O transceiver 163.

Figure 25:
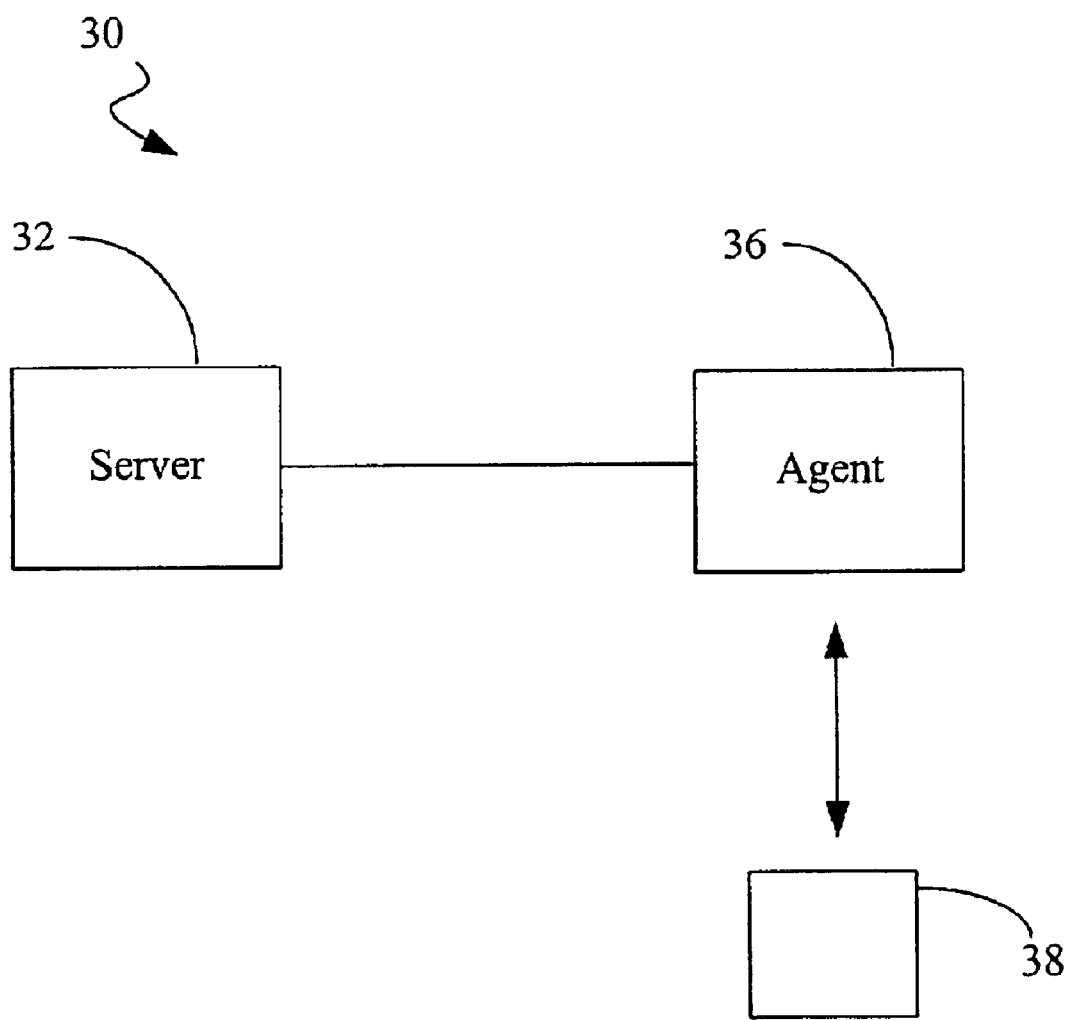
FIG. 25 is a schematic representation of a system for providing transmission information to a fob device.

Alternatively, the wireless network might be able to provide the location of the fob device to the system 30 of FIG. 25. This may be performed, for example, using triangulation methods of the closest network towers (e.g., base transceiver stations (BTS)) as is well known in the art.

Figure 19:
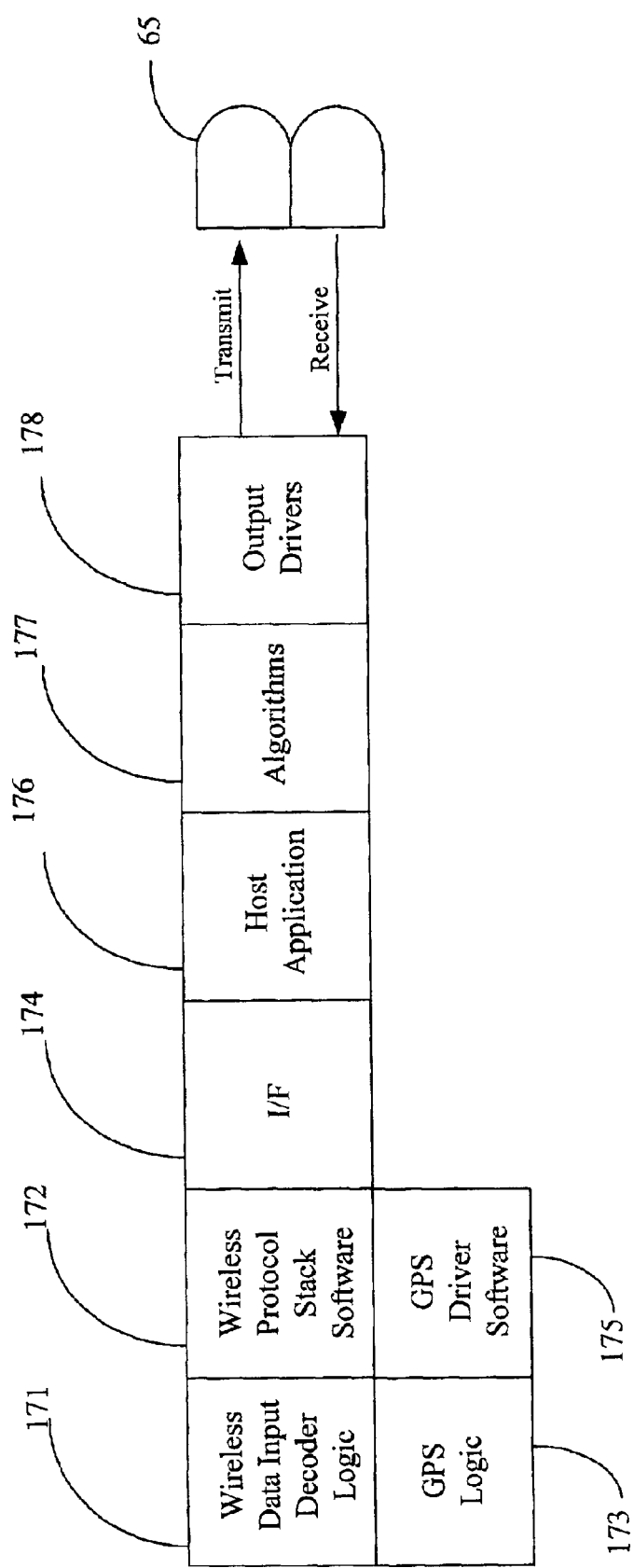
FIG. 19 shows a flow of transmission information data during operation of the control circuit shown in FIG. 18.

FIG. 19 shows an embodiment of a flow of transmission information data during the operation of the control circuit 180 shown in FIG. 18. In this embodiment, the software includes the elements of FIG. 17, but further includes GPS logic 173 and GPS driver software 175 for controlling the input of GPS location information.

Figure 20:
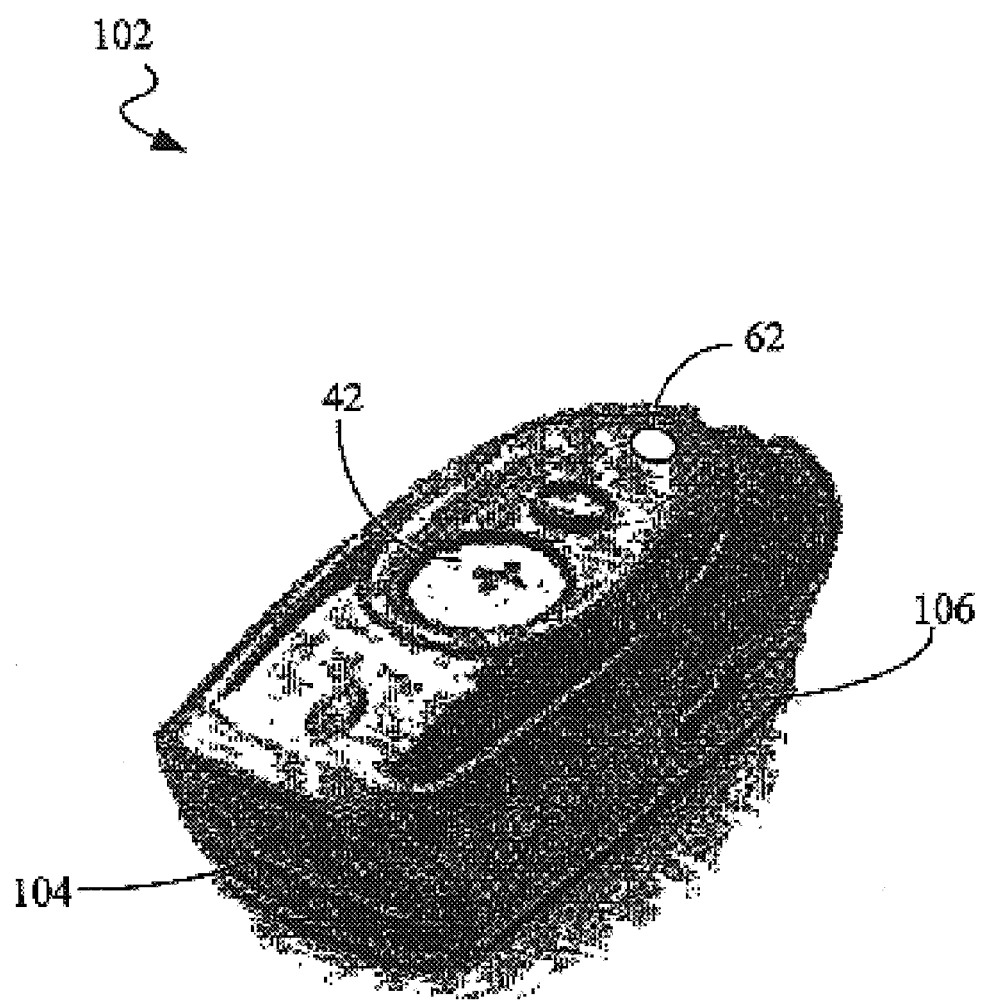
FIG. 20 is a pictorial representation of a fob device in which the input port includes a scanner and in which an output port is used to actively provide a signal representing transmission information data in a light-based signal.
Figure 21:
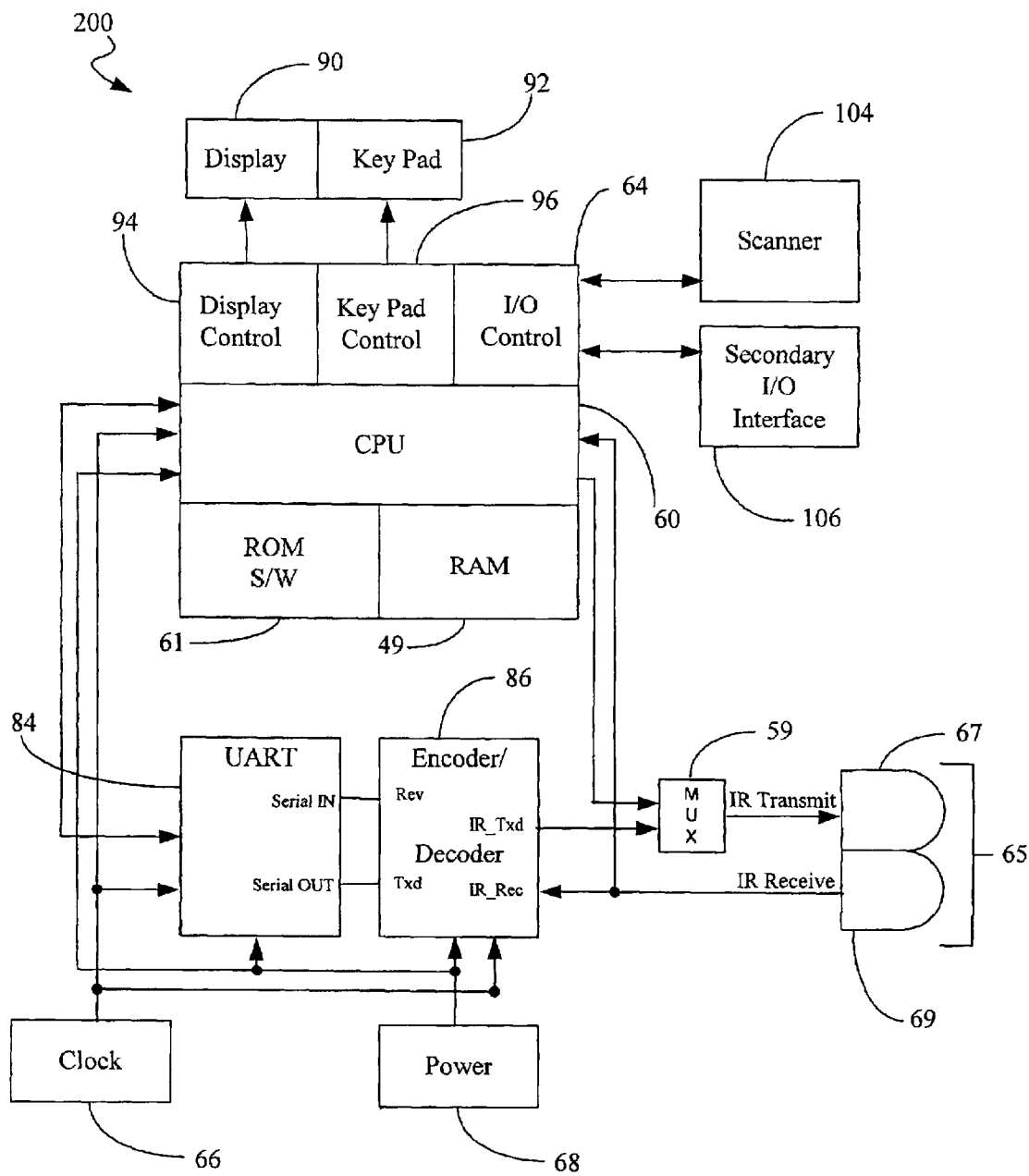
FIG. 21 is a schematic representation of a control circuit that may be use to control the operation of the fob device depicted in FIG. 20.

FIG. 20 shows another embodiment of a fob device 102 of the present invention that further includes a laser scanner 104 as an input port. In this embodiment, the fob device 102 may use the laser scanner 104 to retrieve bar code information, and decode the bar code information into data. FIG. 21 shows a control circuit 200 that may be used with the fob device 102 shown in FIG. 20. In this embodiment, the control circuit 200 receives the bar code information via the scanner 104. The data is then stored by the CPU 60 in the RAM 49 for any desired processing, including retransmission by the transceiver 65 to a light-based data receiving device, such as a bar code scanner or an infrared receiver operating under the IrDA communications protocol. The fob device 102 may also include a secondary input or output port 106, such as a tethered, untethered, or wireless input device, as shown in FIG. 13. A bar code scanner that may be used in a fob device 102 of the present invention is the CS 1504 Consumer Memory Scanner that is commercially available from Symbol Technologies, Inc. located in Holtsville, N.Y. 11742-1300. The CS 1504, for example, allows a consumer to scan and store in memory multiple bar coded items that can later be uploaded to a personal computer. The fob device 102 of the present invention, however, further allows a consumer to retransmit these bar coded items to a bar code scanner. The consumer, for example, could scan UPC codes for the items he or she wants to purchase, scan bar coded coupons, and transmit the entire list directly to the bar code scanner at the check out counter, significantly reducing the time required to have a clerk scan each item individually at the check out counter.

Figure 22:
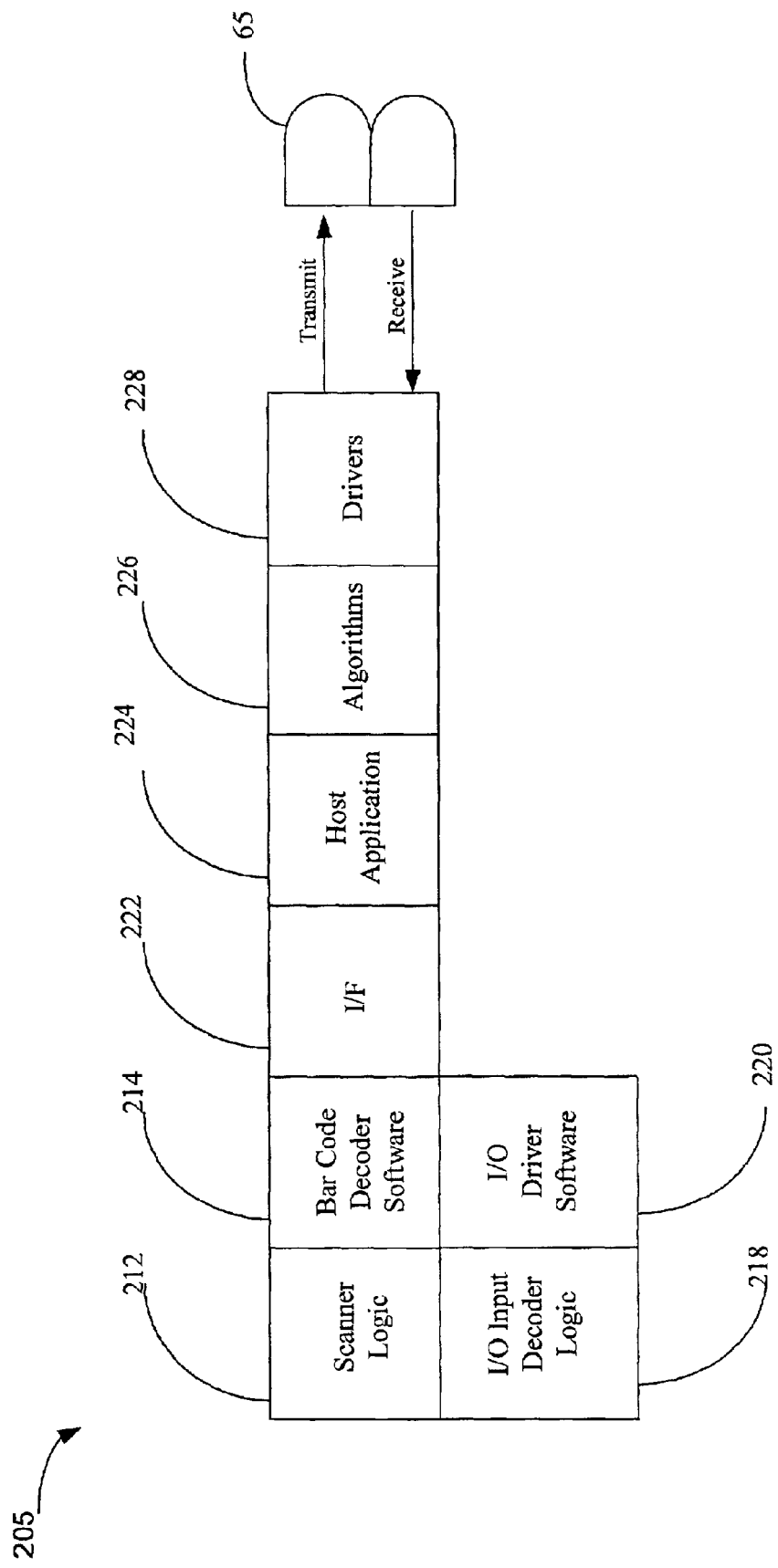
FIG. 22 shows a flow of transmission information data from an input to an output during operation of the control circuit shown in FIG. 21.

FIG. 22 shows an embodiment of a flow of transmission information data during the operation of the control circuit 200 shown in FIG. 21. The scanner logic 212 may include, for example, any scanner controller known in the art. The secondary I/O input decoder logic 218 may include any tethered, untethered, or wireless controller chips or chip sets such as a USB controller chip or a GSM controller chip set. The software stored in ROM 61 includes bar code decoder software 214, I/O driver software 220, an interface 222, a host application 224, encoding and signed generation algorithms 226, and transceiver drivers 228. When the laser scanner input device 104 is activated, the laser scanner generates a laser scanning beam for reflection of a bar code as described in more detail above. A photocell of the laser scanner receives the reflected signal, which is reconstructed and decoded by the scanner logic 212 and the bar code decoder software 214. The host application 224 stores the decoded bar code data in the RAM 49.

When the transmission activation component 42 is activated, the host application 224 retrieves the transmission information data from the RAM 49, manages the encoding and signal generation algorithms 226, and provides the generated signal to the transceiver 65. The transceiver 65 transmits the generated signal, under control of the transceiver drivers 228, as light pulses.

Figure 23:
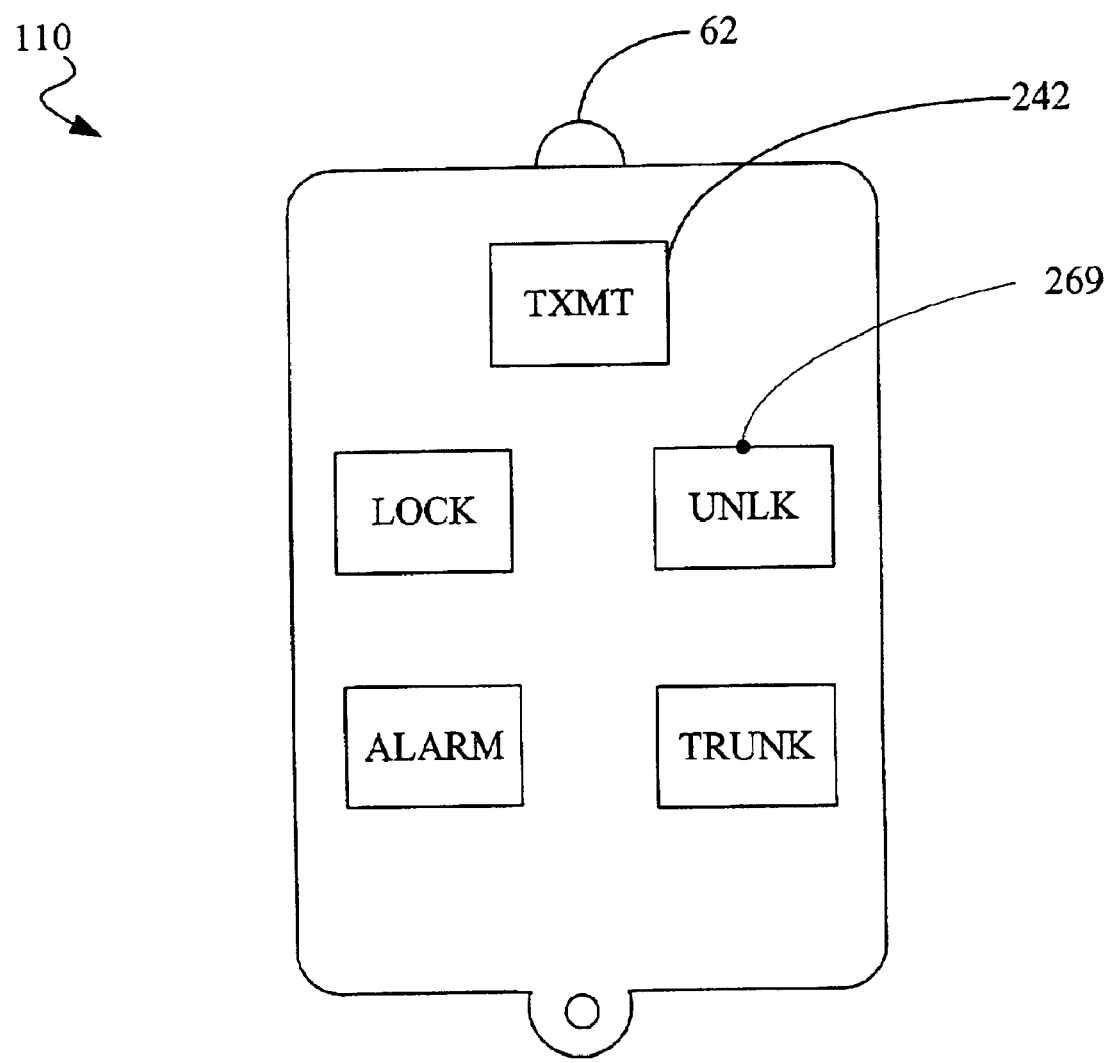
FIG. 23 is a pictorial representation of another fob device for providing a transmission information data in a light-based signal.

FIG. 23 shows another embodiment of a fob device 110 of the present embodiment that includes elements of a car key fob device such as for unlocking and locking a car door, setting a car alarm, and the like. The fob device 110 further includes an output port 62 for transmitting data to a bar code scanner, and may also include other elements such as an input port, a display, and a key pad as described in more detail above. The control circuit of a standard car key fob may be reprogrammed to provide the intended functionality examples of which are described in more detail above.

Today, many cars come with fob devices that perform functions such as unlocking a car door or trunk. These devices may be modified to include transmission of transmission information data using light pulses so that a user does not need to carry multiple fob devices with them. Further, it provides the car dealer or fob device manufacturer the ability to market information to its customers. The fob device 110 may, for example store coupon information in the memory of the fob device that the car purchaser can redeem for service on the car as a way to create an incentive for the purchaser to return to the dealer for service on the car. This is more convenient for the purchaser because the electronic coupons are always on hand with his or her car keys, and is also less expensive for the dealer than to repeatedly mail paper coupons to previous customers. The dealer or fob device manufacturer may also sell rights to other advertisers to include coupons or other promotional information in the fob devices.

Figure 24:
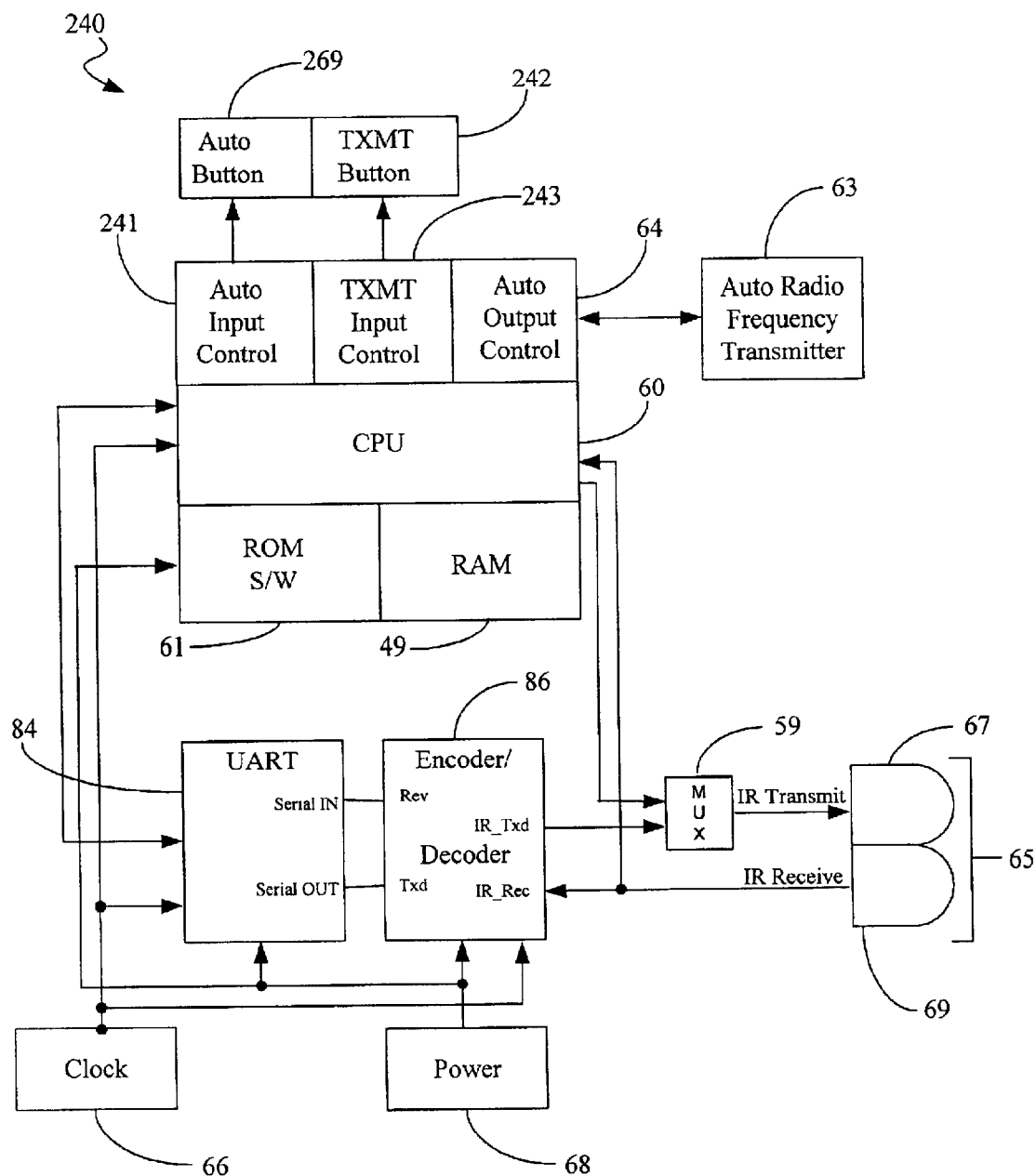
FIG. 24 is a schematic representation of a control circuit that may be used to control the operation of the fob device depicted in FIG. 23.

FIG. 24 shows a control circuit 240 that may be used with the fob device 110 shown in FIG. 23. In this embodiment, the control circuit 240 includes elements such as described with reference to control circuit 100 shown in FIG. 14, and further includes an auto input control 241, a transmit input control 243, an auto output control 264, and an auto radio frequency transmitter 263. The auto input control receives inputs from buttons 269 to perform functions such as locking or unlocking car doors, opening a trunk, setting an alarm, and the like via the auto radio frequency transmitter 263 as is well known in the art for automobile key fob devices.

The control circuit 240 further includes a transmit input control 243 for receiving an activation input from the transmit activation button 242. When the transmit activation button 242 is activated, the CPU 60 retrieves transmission information data from the ROM 61 and/or the RAM 49, encodes the transmission information data, generates a signal from the encoded data, and provides the generated signal to the transceiver 65 for transmission to a light-based data receiving device as described in detail above.

In one embodiment, a fob device may transmit transmission information data in two or more formats or protocols. For example, the control circuits shown in FIGS. 7, 11, 14, 16, 18, 21, and 24 have the capability of transmitting transmission information in two or more formats or protocols. In FIG. 24, for example, the control circuit 240 includes a radio frequency transmitter 63 and a transceiver 65 as output devices. In this embodiment, the fob device 110 can transmit transmission information via either or both output devices. In addition, the fob device 52, under the control of the CPU 60, the UART 84, and/or the encoder/decoder 86 may encode the transmission information data in various data formats or protocols for transmission via the radio frequency transmitter 63 and/or the transceiver 65. The fob device 110, for example, may utilize the transceiver 65 to transmit transmission information data in a light-based signal simulating the reflection of a scanning beam being moved across a static visual image of a bar code and further transmit the same or additional transmission information data in an alternate format, such as, but not limited to, Bluetooth™ protocol via the radio frequency transmitter 63, and/or bar code, IrDA, and/or IRFM protocol via the transceiver 65.

In this embodiment, the fob device 110 may transmit transmission information data in various formats or protocols sequentially and/or contemporaneously to different receiving devices. For example, the fob device 110 can transmit a light based signal simulating the reflection of a scanning beam being moved across a static visual image of a bar code followed by a signal encoded in an IRFM protocol. In this manner, the fob device may communicate the transmission information data in multiple formats or protocols so that the transmission information data may be successfully received by any compatible receiving device. For example, at a point-of-sale, such as a check out counter, the fob device 110 may be used to transmit transmission information data in multiple formats that can be received via a bar code reader, an IRFM receiver, an IrDA receiver, and/or a Bluetooth™ radio frequency receiver. Thus, the fob device 110 can be designed to be compatible with a plurality of receiving devices, any of which might be used in a particular situation. The fob device 110 can further include a selector switch or different activation devices to select one or more transmission formats to be used.

FIG. 25 shows a schematic representation of one implementation of a system 30 for providing transmission information data to a fob device 38. Server 32 is connected to a transfer agent 36. The transfer agent 36 may be any known means of connecting a server 32 to the fob device 38. For example, the transfer agent 36 may include a network, such as a local area network ("LAN"), a wide area network ("WAN"), an intranet, an extranet, the Internet, other wired or wireless networks or other known network that the fob device 38 may directly connect to, such as a fob device having an IP address. Alternatively, the transfer agent may include a network and a connection mechanism such as a wireless operator, a client, a personal computer, a host, an ISP, a PDA, or any other device that the fob device 38 can operatively connect to, whether tethered, untethered, or an over the air (OTA) wireless connection. For example, the fob device 38 may communicate with the server 32 via wireless technology see, e.g., the wireless embodiment described above with reference to FIG. 16, cellular technology, phone line, dedicated service line, digital subscriber line ("DSL"), cable connection, or other known remote access technology. In one approach, for example, the server 32 may maintain a database of transmission information data items that are transmitted to the fob device 38 via the agent 36. A user of the fob device may remotely select one or more transmission information data items, or the server 32 may provide a transmission information data item that has been selected for the user of the fob device 38 via the server 32, such as an item selected according to preferences and/or permissions of the fob device 38 as stored on the server 32. The server 32 retrieves the one or more transmission information data items from the database and provides the transmission information data to the fob device via agent 36. In this approach, the fob device 38 receives the transmission information data in block 20 of FIG. 2, and performs the remaining operations depicted in blocks 22, 24, 25, 27, and 28.

Alternatively, some or all of the processing shown in blocks 20, 22, 24, 25, and 27 may be performed upstream of the fob device 38, such as at server 32, or at any host associated with the agent 36. For example, the server 32 may retrieve transmission information data from a database, either on its own or in response to a request from the user of the fob device 38, identify a bar code type (block 24), encode the transmission information data into a bar code format such as the array described above (block 25), and transmit the array to the fob device. If the fob device 38 does not already have the optional representative information to display on the screen of the device 38 (block 22), the server 32 may also provide this information to the fob device 38. Information provided to the fob device 38 may be encrypted and/or compressed as known in the art.

Figure 26:
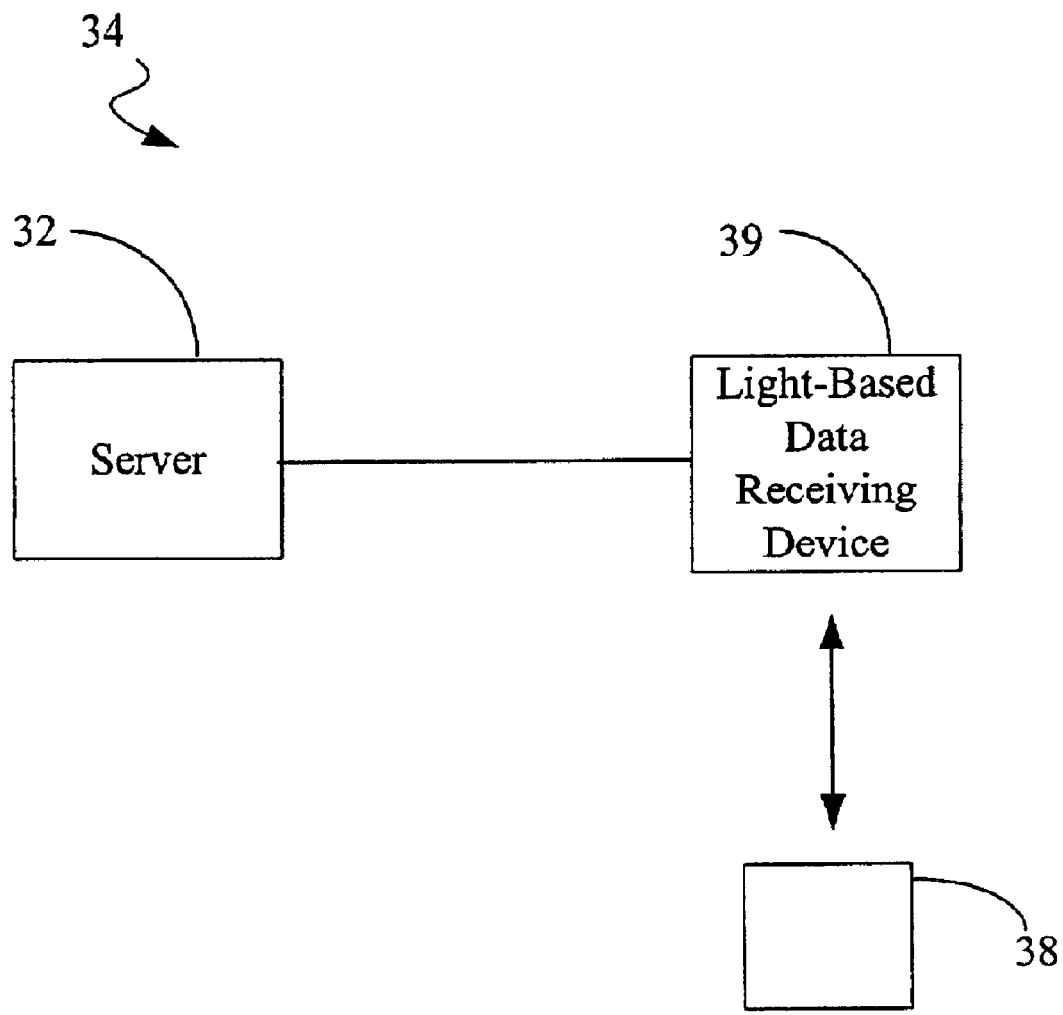
FIG. 26 is a schematic representation of an alternative system for providing transmission information to a fob device.

FIG. 26 shows an alternative embodiment of a system 34 in which the light-based data receiving device 39 is operatively connected to the server 32. The light-based data receiving device 39 may be connected to the server in any manner described above with reference to FIG. 25. In this embodiment, the fob device 38, for example, may transmit identification information, such as an identification code, via light pulses. The receiving device 39 then may retrieve further transmission information data from the server 32. The receiving device 39 may receive, for example, coupons, vouchers, boarding pass information, e-ticket information, ticket information, credit card information, debit card information, automated letter card information or other electronic payment information, identification information account information, wire transfer information, purchase information, security information, affinity information, user preference information, user purchase history information and so forth. Alternatively, the fob device 38 may receive any of this information form the server 32, either directly via the receiving device 39, or some other transfer agent such as described above with reference to FIG. 25.

The description of the various embodiments set forth herein is illustrative of our invention and is not intended to limit the scope thereof, as variations and/or modifications are possible. Various features listed above, for example, may be interchanged to create a fob device with any number or combination of input devices, such as a tethered input device, an untethered input device, a wireless communication input device, or a laser scanner input device. Alternatives and equivalents may be apparent from this description. These and other variations and modifications of the embodiments disclosed herein may be made without departing from the scope and spirit of the invention.

What is claimed is:

1. A method of communicating transmission information data to a light-based data receiving device with a fob device, the method comprising:

encoding the transmission information data into a bar code format;

generating a signal from the bar code format to simulate a reflection of a scanning beam being moved across a static visual image of the bar code format; and actively transmitting the signal as light pulses from a fob device.

2. The method of claim 1, wherein the light-based data receiving device includes a bar code scanner.

3. The method of claim 1, further comprising identifying a bar code type, wherein the bar code format corresponds to the bar code type.

4. The method of claim 1, further comprising receiving the transmission information data with the fob device from a personal computer, a server, a client, a database, a network, a wireless host, a wireless port, a wireless operator, or the Internet.

5. The method of claim 1, further comprising receiving the bar code format with the fob device from a personal computer, a server, a client a database, a network, a wireless host, a wireless port, a wireless operator, or an Internet.

6. The method of claim 1, further comprising programming the bar code format into the fob device.

7. The method of claim 1, further comprising receiving the signal with the fob device from a personal computer, a server, a client a database, a network, a wireless host, a wireless port, a wireless operator, or an Internet.

8. The method of claim 2, further comprising
receiving a scanning beam from the bar code scanner; and
determining a scan rate of the scanning beam.

9. The method of claim 1, further comprising presenting representative information of the transmission information data using a user output facility of a fob device.

10. The method of claim 9, wherein the output facility includes a display.

11. The method of claim 9, further comprising displaying a static visual image of the bar code format.

12. The method of claim 1, wherein the transmission information data is acquired.

13. The method of claim 1, wherein the transmission information data is generated.

14. The method of claim 1, wherein the signal is transmitted via an LED, an infra-red transmitter, or a display screen.

15. The method of claim 1, wherein the signal is transmitted via light pulses in a visible light spectrum or in an infrared light spectrum.

16. The method of claim 9, wherein the signal is transmitted via altering a brightness, a backlight, a contrast, a color, or a power attribute of the display, or any combination thereof.

17. The method of claim 1, wherein the transmitting step utilizes a color light source.

18. The method of claim 17, wherein at least one color is used that is adapted to be accepted by a bar code scanner.

19. The method of claim 17, wherein at least one color is used that is adapted to be rejected by a bar code scanner.

20. The method of claim 1, wherein the signal is transmitted via turning an LED on and off, or activating and deactivating an infrared transmitter.

21. A fob device for providing transmission information data encoded in a bar code format to a light-based data receiving device, the fob device comprising:
   a first program component for generating a signal from transmission information data encoded in a bar code format to simulate a reflection of a scanning beam being moved across a static visual image of the bar code format; and
   a light source for actively transmitting the signal as light pulses from a fob device.

22. The fob device of claim 21, further comprising a second program component for encoding transmission information data to obtain the bar code format.

23. The fob device of claim 21, wherein the transmission information data is pre-encoded into the bar code format.

24. The fob device of claim 21, wherein the light-based data receiving device includes a bar code scanner.

25. The fob device of claim 21, wherein the bar code format corresponds to a selected bar code type.

26. The fob device of claim 21, further comprising a display for displaying a static visual image of the bar code format.

27. The fob device of claim 21, wherein the transmission information data is received from a personal computer, a server, a client, a database, a network, a wireless host, a wireless port, a wireless operator, or an Internet.

28. The fob device of claim 24, further comprising a receiver adapted to receive a scanning beam from the bar code scanner for determining a scan rate of the scanning beam.

29. A fob device of claim 21, further comprising an output facility for presenting representative information of the transmission information data on the fob device.

30. The fob device of claim 29, wherein the output facility includes a speaker.

31. The fob device of claim 29, wherein the output facility comprises a display for further displaying a static visual image of the bar code format.

32. The fob device of claim 21, wherein the transmission information data is acquired.

33. The fob device of claim 21, wherein the transmission information data is generated.

34. The fob device of claim 21, wherein the light source includes an LED, an infra-red transmitter, or a display screen.

35. The fob device of claim 21, wherein the light source transmits the signal in a visible light spectrum, or in an infrared light spectrum.

36. The fob device of claim 21, wherein the light source includes a display for transmitting the signal via altering a brightness, a backlight, a contrast, a color, or a power attribute of the display, or any combination thereof.

37. The fob device of claim 21, wherein at least one color is used by the light source that is adapted to be accepted by a bar code scanner.

38. The fob device of claim 21, wherein at least one color is used by the light source that is adapted to be rejected by a bar code scanner.

39. The fob device of claim 21, wherein the light source transmits the signal via one or more of the group comprising turning an LED on and off and activating and deactivating an infrared transmitter.

40. A system for providing transmission information data from a fob device to a light-based data receiving device, the system comprising:
   a server for providing transmission information data;
   a fob device including a light source for actively providing a signal as light pulses; and
   a transfer agent for providing communications between the server and the fob device,
   wherein the transmission information data is encoded and the signal is generated from the encoded data.

41. The system of claim 40, further comprising a light-based data receiving device for receiving the signal provided by the fob device.

42. The system of claim 40, wherein the transmission information data is encoded into a bar code format.

43. The system of claim 42, wherein the signal is generated from the encoded data to simulate a reflection of a scanning beam being moved across a static visual image of the bar code format.

44. The system of claim 40, wherein the light-based data receiving device includes a bar code scanner.

45. The system of claim 42, wherein the bar code format corresponds to a selected bar code type.

46. The system of claim 40, wherein the light source includes an LED, an infra-red transmitter, or a display screen.

47. The system of claim 40, wherein the transfer agent includes a personal computer, a second server, a client, a database, a network, a wireless host, a wireless port, a wireless operator, or the Internet.

48. The system of claim 42 wherein the encoded data is received by the fob device.

49. The system of claim 40, wherein the signal is received by the fob device.

50. The system of claim 44, wherein the fob device is adapted to receive a scanning beam from the bar code scanner to determine a scan rate of the scanning beam.

51. A system for providing transmission information data to a light-based data receiving device, the system comprising:
   a server;
   a light-based data receiving device operatively connected to the server; and
   a fob device including a light source,
   wherein the fob device actively provides transmission information data as light pulses from the light source to a light-based data receiving device.

52. The system of claim 51, wherein the fob device further comprises an output facility, wherein the fob device presents representative information on the output facility.

53. The system of claim 51, wherein the light-based data receiving device provides information to the server in response to receiving the transmission information data from the fob and the server provides a second transmission information data to the light-based data receiving device in response to the transmission information data.

54. The system of claim 53, wherein the information provided by the light-based data receiving device to the server is at least a portion of the transmission information data provided by the fob device to the light-based data receiving device.

55. The system of claim 51, wherein the transmission information data is encoded into a bar code format.

56. The system of claim 55, wherein the signal is generated from the bar code format to simulate a reflection of a scanning beam being moved across a static visual image of the bar code format.

57. The system of claim 55, wherein the light-based data receiving device includes a bar code scanner.

58. The system of claim 55, wherein the bar code format corresponds to a selected bar code type.

59. The system of claim 52, wherein the output facility comprises a display for displaying a static visual image of the bar code format.

60. The system of claim 51, wherein the transmission information data is acquired by the server.

61. The system of claim 51, wherein the transmission information data is generated by the server.

62. The system of claim 51, wherein the light source includes an LED, an infra-red transmitter, or a display screen.

63. The system of claim 51, wherein the light source transmits the signal in a visible light spectrum, or in an infrared light spectrum.

64. The system of claim 51, wherein the light source transmits the signal via altering a brightness, a backlight, a contrast, a color, or a power attribute of the display, or any combination thereof.

65. The system of claim 51, wherein at least one color is used by the light source that is adapted to be accepted by a bar code scanner.

66. The system of claim 51, wherein at least one color is used by the light source that is adapted to be rejected by a bar code scanner.

67. The system of claim 51, wherein the light source transmits the signal via turning an LED on and off, or activating and deactivating an infrared transmitter.

68. The system of claim 51, wherein the server retrieves the transmission information data via a personal computer, a second server, a client, a database, a network, a wireless host, a wireless port, a wireless operator, or an Internet.

69. The system of claim 55, wherein the bar code format is received by the fob device.

70. The system of claim 51, wherein the signal is received by the fob device.

71. The system of claim 57, wherein the fob device is adapted to receive a scanning beam from the bar code scanner to determine a scan rate of the scanning beam.

72. The system of claim 52, wherein the output facility and the light source are the same.

73. A fob device for transmitting transmission information data to a light-based data receiving device, the fob device comprising:
generating means for generating a signal to simulate the reflection of a scanning beam being moved across a static visual image of a bar code format; and
transmission means for transmitting the signal as light from a fob device.

74. The fob device of claim 73, further comprising encoding means for encoding the transmission information data into the bar code format.

75. The fob device of claim 73, further comprising a presentation means for presenting representative information of the transmission information data.

76. The fob device of claim 73, wherein the light-based data receiving device includes a bar code scanner.

77. The fob device of claim 73, further comprising identification means for identifying a bar code type, wherein the bar code format corresponds to the bar code type.

78. The fob device of claim 73, wherein the bar code format is displayed on the presentation means in a static visual form.

79. The fob device of claim 73, further comprising acquisition means for acquiring the transmission information data.

80. A fob device for providing transmission information data as light pulses, the fob device comprising:
a scanner for scanning a bar code;
a program component responsive to the scanner for generating a signal from the bar code; and
a transmitter for transmitting the signal as light pulses.

81. The fob device of claim 80, further comprising a program component for decoding the bar code.

82. The fob device of claim 80, wherein the program component for generating the signal generates the signal to simulate a reflection of a scanning beam being moved across the static visual image of the bar code.

83. A method of communicating commercial information data to a light-based data receiving device, the method comprising:
generating a signal from commercial information data; and
actively transmitting the signal as light pulses from a fob device.

84. The method of claim 83, further comprising encoding the commercial information data prior to generating the signal from the commercial information data.

85. The method of claim 84, wherein the commercial information data is encoded into a bar code format.

86. The method of claim 85, wherein the generation of the signal simulates a reflection of a scanning beam being moved across a static visual image of the bar code format.

87. The method of claim 83, wherein the commercial information data is pre-encoded.

88. A method of communicating transmission information data from a fob device, the method comprising:
generating a first signal from a first encoded format;
generating a second signal from a second encoded format;
transmitting the first signal as light pulses from a fob device; and
transmitting the second signal from the fob device.

89. The method of claim 88, further comprising encoding a first transmission information data into the first encoded format.

90. The method of claim 88, further comprising encoding a second transmission information data into the second encoded format.

91. The method of claim 88, wherein the first and the second transmission information data are the same.

92. The method of claim 88, wherein the first encoded format includes a bar code format.

93. The method of claim 92, wherein the first signal simulates a reflection of a scanning beam being moved across a static visual image of the bar code format.

94. The method of claim 92, wherein the second encoded format includes at least one of an IrDA protocol, an IRFM protocol, a Bluetooth™ protocol, a radio frequency protocol, a serial protocol, an USB protocol, a parallel protocol, a wireless protocol, an over-the-air wireless protocol, a wireless paging protocol, a FLEX™ protocol, a ReFLEX™ protocol, a wireless cellular protocol, a WAP protocol, and an SMS protocol.

95. Them method of claim 92, wherein the bar code format corresponds to a first bar code type and the second encoded format includes a second bar code format corresponding to a second bar code type.

96. The method of claim 88, wherein the first encoded format includes at least one of an IrDA protocol, an IRFM protocol, a Bluetooth™ protocol, a radio frequency protocol, a serial protocol, an USB protocol, a parallel protocol, a wireless protocol, an over-the-air wireless protocol, a wireless paging protocol, a FLEX™ protocol, a ReFLEX™ protocol, a wireless cellular protocol, a WAP protocol, and an SMS protocol.

97. The method of claim 88, further comprising loading the first transmission information data onto the fob device.

98. The method of claim 88, further comprising loading the first encoded format onto the fob device.

99. The method of claim 88, further comprising loading the first signal onto the fob device.

* * * * *